United States Patent
Yoshioka et al.

(10) Patent No.: US 8,798,905 B2
(45) Date of Patent: Aug. 5, 2014

(54) VEHICLE LOCATION DETECTION DEVICE AND VEHICLE LOCATION DETECTION METHOD

(75) Inventors: Mototaka Yoshioka, Osaka (JP); Shinichi Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 797 days.

(21) Appl. No.: 13/076,061

(22) Filed: Mar. 30, 2011

(65) Prior Publication Data

US 2011/0175755 A1    Jul. 21, 2011

Related U.S. Application Data

(63) Continuation of application No. PCT/JP2010/004330, filed on Jul. 1, 2010.

(30) Foreign Application Priority Data

Jul. 2, 2009  (JP) ................................ 2009-158281

(51) Int. Cl.
| | |
|---|---|
| *G05D 1/02* | (2006.01) |
| *G01S 3/808* | (2006.01) |
| *B60W 50/14* | (2012.01) |
| *B60W 30/08* | (2012.01) |
| *G01S 5/18* | (2006.01) |
| *G08G 1/04* | (2006.01) |
| *G08G 1/16* | (2006.01) |

(52) U.S. Cl.
CPC .............. *G01S 3/8083* (2013.01); *B60W 50/14* (2013.01); *B60W 30/08* (2013.01); *G01S 5/18* (2013.01); *G08G 1/04* (2013.01); *G08G 1/16* (2013.01)
USPC ........... 701/300; 701/301; 340/435; 340/692; 340/903; 340/988; 340/995.1

(58) Field of Classification Search
CPC ........... G01S 3/8083; G01S 5/18; G08G 1/16; G08G 1/04; B60W 50/14; B60W 30/08
USPC .......... 701/300, 301; 340/435, 436, 460, 692, 340/903, 995.1, 988; 180/167; 280/735
See application file for complete search history.

(56) References Cited

U.S. PATENT DOCUMENTS 5,265,831 A * 11/1993 Muller .......................... 246/124
5,450,057 A *  9/1995 Watanabe ..................... 340/435
(Continued)

FOREIGN PATENT DOCUMENTS

| CN | 1946985 | 4/2007 |
|---|---|---|
| CN | 101256082 | 9/2008 |

(Continued)

OTHER PUBLICATIONS

International Search Report issued Sep. 28, 2010 which is the priority application of International Application No. PCT/JP2010/004330.
(Continued)

*Primary Examiner* — Gertrude Arthur Jeanglaude
(74) *Attorney, Agent, or Firm* — Wenderoth, Lind & Ponack, LLP

(57) ABSTRACT

The vehicle location detection device includes: a sound source location specifying unit which calculates an attenuation amount of a sound pressure of a vehicle sound by subtracting a sound pressure detected by a sound pressure detecting unit from a sound pressure indicated by vehicle sound pressure information stored in a sound pressure information storage unit, and specifies a location where another vehicle emitting a vehicle sound is predicted to be present, by specifying a sound source location of a sound diffracted by an obstacle which is specified by a diffraction location specifying unit and serves as a diffraction point, based on the calculated attenuation amount, a rule indicating an attenuation amount dependent on a propagation distance of the sound, and a relationship indicated by diffraction information stored in a diffraction information storage unit; and a presentation unit which presents the specified location.

12 Claims, 28 Drawing Sheets

(56) References Cited

U.S. PATENT DOCUMENTS

| | | | |
|---|---|---|---|
| 6,097,285 A * | 8/2000 | Curtin | 340/436 |
| 7,248,171 B2 * | 7/2007 | Mishelevich | 340/573.1 |
| 7,274,288 B2 * | 9/2007 | Nagata | 340/438 |
| 8,212,659 B2 * | 7/2012 | Iwamoto | 340/435 |
| 2006/0259213 A1 | 11/2006 | Hashimoto et al. | |
| 2008/0215239 A1 | 9/2008 | Lee | |
| 2009/0154712 A1 | 6/2009 | Morii et al. | |
| 2010/0228482 A1 | 9/2010 | Yonak | |

FOREIGN PATENT DOCUMENTS

| | | |
|---|---|---|
| JP | 1-265176 | 10/1989 |
| JP | 5-92767 | 12/1993 |
| JP | 9-189763 | 7/1997 |
| JP | 11-48886 | 2/1999 |
| JP | 2000-99853 | 4/2000 |
| JP | 2000-123267 | 4/2000 |
| JP | 2005-301751 | 10/2005 |
| JP | 2010-204104 | 9/2010 |
| WO | 2006/080120 | 8/2006 |

OTHER PUBLICATIONS

Kenichi Miyao et al., Nihon Kenchiku Gakkai (Ed.) "*Jitsumu teki souon taisaku shishin oyohen*", Gihodo Shuppan Co., Ltd., 1987, p. 14 with its partial English translation.

* cited by examiner

FIG. 3

| Vehicle | Low sound pressure | High sound pressure |
|---|---|---|
| Motorcycle (400 cc) | 68 dB | 78 dB |
| | | |

| Sound pressure at sound source location [dB] | Distance [m] | | | | | | | | | |
|---|---|---|---|---|---|---|---|---|---|---|
| | 15 | 18 | 40 | 60 | 80 | 100 | 120 | 150 | 200 | 300 |
| 78 | 78 | 77 | 70 | 66 | 64 | 62 | 60 | 58 | 56 | 52 |
| 68 | 68 | 67 | 60 | 56 | 54 | 52 | 50 | 48 | 46 | 42 |
| .. | .. | .. | .. | .. | .. | .. | .. | .. | .. | .. |

FIG. 14

| Frequency | Sound pressure |
|---|---|
| 100 Hz — 130 Hz | 38 dB |
| 200 Hz — 260 Hz | 37 dB |
| . . | . . |
| 30 Hz — 45 Hz | 35 dB |
| 60 Hz — 90 Hz | 34 dB |
| . . | . . |

103a

{ 100 Hz — 130 Hz, 200 Hz — 260 Hz } Vehicle sound pressure information of motorcycle { 30 Hz — 45 Hz, 60 Hz — 90 Hz } Vehicle sound pressure information of automobile

FIG. 24

| | Frequency | Low sound pressure | High sound pressure |
|---|---|---|---|
| Vehicle sound pressure information of motorcycle | 100 Hz – 130 Hz | 38 dB | 48 dB |
| Vehicle sound pressure information of automobile | 30 Hz – 45 Hz | 35 dB | 53 dB |
| Vehicle sound pressure information of moped | .. | .. | .. |

VEHICLE LOCATION DETECTION DEVICE AND VEHICLE LOCATION DETECTION METHOD

CROSS REFERENCE TO RELATED APPLICATION

This is a continuation application of PCT application No. PCT/JP2010/004330 filed on Jul. 1, 2010, designating the United States of America.

BACKGROUND OF THE INVENTION (1) Field of the Invention

The present invention relates to vehicle location detection devices which specify, using a vehicle sound of another vehicle, a location of the other vehicle, and in particular to a vehicle location detection device which specifies a location of the other vehicle hidden behind an obstacle.

(2) Description of the Related Art

When a vehicle is in operation, detecting other vehicles near or approaching the vehicle is useful for safe driving. Various methods have been conventionally proposed as techniques for detecting such vehicles.

For instance, there is a technique for detecting a sound pressure and a frequency of a sound emitted by a moving object and specifying a distance to the moving object based on the detected sound pressure and frequency (e.g., Patent Reference 1: Japanese Unexamined Patent Application Publication No. 1-265176). In Patent Reference 1, the distance to the moving object is determined by calculating, using a distance attenuation equation based on a sound pressure and a frequency, four variables which are sound pressures T1 and T2 (two variables), of a sound emitted by the moving object, at a sound source location of frequencies f1 and f2 and distances r1 and r2 (two variables) to two detection locations.

Furthermore, as another conventional technique, there is a technique for specifying a location of an emergency vehicle by detecting a sound pressure and a frequency of a warning sound emitted by the emergency vehicle, calculating a distance to and a moving direction of the emergency vehicle, respectively, based on the detected sound pressure and frequency, and referring to map information (e.g., Patent Reference 2: Japanese Unexamined Patent Application Publication No. 2005-301751).

SUMMARY OF THE INVENTION

However, with the techniques proposed in Patent References 1 and 2, in some cases, it is erroneously determined that another vehicle is at a distance farther than an actual distance because a sound pressure attenuation amount is significantly large when an obstacle is between a detection location and a sound source location. For example, when the techniques are applied to prevent a collision at an intersection having poor visibility, there is a chance that a driver misunderstand that an approaching, detected other vehicle is at a far distance. In other words, the conventional techniques do not make it possible to detect a location of another vehicle hidden behind an obstacle.

The present invention has been devised to solve the conventional problem, and has an object to provide a vehicle location detection device which specifies the location of the other vehicle even if the other vehicle is hidden behind the obstacle.

A vehicle location detection device according to the present invention is a vehicle location detection device which is mounted in a vehicle and detects a location of an other vehicle near the vehicle, the vehicle location detection device including: an obstacle information storage unit configured to store obstacle information indicating a geographical location of an obstacle which is likely to block propagation of a vehicle sound; a sound pressure information storage unit configured to store vehicle sound pressure information indicating a sound pressure of a vehicle sound at a sound source location; a diffraction information storage unit configured to store diffraction information indicating a relationship between a positional relationship and an attenuation amount of a sound pressure, the positional relationship being a relationship among a sound source, a diffraction point, and an observation point of a sound when the sound is diffracted and propagated; a sound pressure detecting unit configured to detect a sound pressure of a vehicle sound which has reached the vehicle; a direction specifying unit configured to specify a direction from which the vehicle sound has reached; a vehicle location detecting unit configured to detect a vehicle location which is a location of the vehicle; a diffraction location specifying unit configured to refer to the obstacle information stored in the obstacle information storage unit, and specify a location of an obstacle in the direction specified by the direction specifying unit, based on the vehicle location detected by the vehicle location detecting unit; a sound source location specifying unit configured to calculate an attenuation amount of the sound pressure of the vehicle sound by subtracting the sound pressure detected by the sound pressure detecting unit from the sound pressure indicated by the vehicle sound pressure information stored in the sound pressure information storage unit, and specify a location where the other vehicle emitting the vehicle sound is predicted to be present, by specifying a sound source location of a sound diffracted by the obstacle which is specified by the diffraction location specifying unit and serves as a diffraction point, based on the calculated attenuation amount, a rule indicating an attenuation amount dependent on a propagation distance of the sound, and the relationship indicated by the diffraction information stored in the diffraction information storage unit; and a presentation unit configured to present the location specified by the sound source location specifying unit.

With this configuration, it is possible to specify the sound source location of the vehicle sound of the other vehicle hidden behind the obstacle, by specifying the diffraction location of the vehicle sound based on the location of the obstacle and the sound source direction and using the attenuation amount of the sound pressure by distance and the attenuation amount of the sound pressure determined by a degree of blocking dependent on the diffraction location. To stated differently, the calculated attenuation amount of the sound pressure is separated into the attenuation amount dependent on the distance of the sound pressure from the sound source location through the diffraction location to the vehicle location and the attenuation amount of the sound pressure by diffraction, and thus it is possible to accurately determine the sound source location in view of the attenuation of the sound pressure by diffraction, in comparison to a case where only the distance is considered. With this, for instance, when the present invention is applied to prevent a collision at an intersection having poor visibility, it is possible to separately present, to a driver, an approaching other vehicle in a blind spot and another vehicle in a blind spot and still at a far distance.

It is to be noted that, as a specific example of the diffraction information, the diffraction information may indicate, as the relationship between the positional relationship and the attenuation amount of the sound pressure, a relationship between a path difference which the sound is attenuated depending on and an attenuation amount of a sound pressure, the path difference being a difference between a distance of a path from the sound source of the diffracted sound through the diffraction point to the observation point of the sound and a linear distance from the sound source to the observation point. In this case, the sound source location specifying unit is configured to specify the sound source location based on the rule indicating the attenuation amount dependent on the propagation distance of the sound and the relationship between the path difference and the attenuation amount of the sound pressure, the relationship being indicated by the diffraction information stored in the diffraction information storage unit.

Here, it is preferred that the sound source location specifying unit is configured to specify: a plurality of paths as paths which satisfy the rule and the relationship and on which the sound is diffracted; an elongated area by connecting sound source locations on the specified paths; and, within the specified elongated area, the location where the other vehicle emitting the vehicle sound is predicted to be present. This is because there is a case where paths of a sound are predicted even when the attenuation amount dependent on the propagation distance of the sound and the attenuation amount dependent on the magnitude of the diffraction of the sound, and thus it is preferred that areas having a range corresponding to the paths of the sound are predicted as sound source locations.

Furthermore, it is preferred that the sound pressure information storage unit is configured to store, for frequencies, pieces of vehicle sound pressure information in each of which a frequency of the vehicle sound and the sound pressure are associated with each other, that the sound pressure detecting unit further includes a vehicle sound frequency detecting unit configured to detect the frequency and the sound pressure of a main frequency component that is included in the vehicle sound, by performing frequency resolution on the vehicle sound, and that the sound source location specifying unit is configured to calculate for the frequency detected by the vehicle sound frequency detecting unit, the attenuation amount of the sound pressure of the vehicle sound by subtracting a sound pressure corresponding to the frequency detected by the vehicle sound frequency detecting unit from the sound pressure indicated by the vehicle sound pressure information stored in the sound pressure information storage unit.

With this configuration, it is possible to determine a degree of blocking based on a difference in an attenuation amount of a sound pressure for each frequency determined by a degree of blocking, and thus it is possible to accurately determine the sound source location of the vehicle sound of the other vehicle hidden behind the obstacle. For example, an attenuation amount of a sound pressure by diffraction is large for a high frequency and is small for a low frequency, and thus it is possible to accurately determine the sound source location because the degree of blocking is determined in view of a difference in the characteristic.

Moreover, it is preferred that the sound pressure information storage unit is configured to store, for fundamental frequencies of different engine sounds, the pieces of the vehicle sound pressure information, and that the vehicle sound frequency detecting unit is configured to detect a frequency and a sound pressure of a fundamental frequency component of an engine sound included in the vehicle sound. Here, in addition, it is preferred that the sound pressure information storage unit is further configured to store, for harmonics of the fundamental frequencies of the different engine sounds, the pieces of the vehicle sound pressure information, that the vehicle sound frequency detecting unit is configured to detect the fundamental frequency component and a harmonic component each of which includes the frequency and the sound pressure of the engine sound included in the vehicle sound, and that the sound source location specifying unit is configured to specify, for each of the fundamental frequency component and the harmonic component detected by the vehicle sound frequency detecting unit, the elongated area, and specify, as the location where the other vehicle emitting the vehicle sound is predicted to be present, an area where the specified elongated area corresponding to the fundamental frequency component and the specified elongated area corresponding to the harmonic component overlap with each other.

With this configuration, unlike a sound of a traveling vehicle with tires in which a sound source sound pressure tends to vary depending on a traveling condition or a road surface condition, the engine sound has a value of a specific sound pressure corresponding to an engine speed (corresponding to the fundamental frequency of the engine sound), and thus it is possible to accurately determine the attenuation amount of the sound pressure between the detection location and the sound source location. Furthermore, the engine sound has a harmonic structure, and thus it is possible to accurately determine the sound source location of the vehicle sound of the other vehicle hidden behind the obstacle, by using the difference in the attenuation amount of the sound pressure for each frequency determined by the degree of blocking. For instance, an attenuation amount of a sound pressure by diffraction is large for an engine sound having a high frequency and the harmonic structure and small for an engine sound having a low frequency and the harmonic structure, and thus it is possible to determine a more accurate degree of blocking by calculating, using the difference in the characteristic, the sound source location which satisfies the relationship of the attenuation amounts in the both frequencies. Consequently, it is possible to accurately determine the sound source location.

Moreover, the sound pressure information storage unit may be configured to store, for each of the fundamental frequencies of the different engine sounds, pieces of vehicle sound pressure information each of which indicates the sound pressure at the sound source location with a range of the sound pressure using at least a low sound pressure and a high sound pressure, and the sound source location specifying unit may be configured to (i) calculate, for each of the low sound pressure and the high sound pressure which correspond to the frequency detected by the vehicle sound frequency detecting unit and are indicated by the pieces of the vehicle sound pressure information, the attenuation amount of the sound pressure of the vehicle sound by subtracting the sound pressure corresponding to the frequency detected by the vehicle sound frequency detecting unit from the sound pressure indicated by the vehicle sound pressure information stored in the sound pressure information storage unit, (ii) specify, for each of the low sound pressure and the high sound pressure, the elongated area based on the calculated attenuation amount, and (iii) specify, as the location where the other vehicle emitting the vehicle sound is predicted to be present, an area which is enclosed by the specified elongated area corresponding to the low sound pressure and the specified elongated area corresponding to the high sound pressure.

With this configuration, the predicted location of the other vehicle has the range because it is considered that the sound pressure of the sound source has the range, and thus it is possible to predict the location of the other vehicle more realistically.

Furthermore, the obstacle information storage unit may be further configured to store map information indicating a location of a street, and the sound source location specifying unit may be configured to specify, as the location where the other vehicle emitting the vehicle sound is predicted to be present, an area which is within an elongated area and on the street indicated by the map information, to specify, as the location where the other vehicle emitting the vehicle sound is predicted to be present, an area where the elongated areas overlap with each other and which is on the street indicated by the map information, or to specify, as the location where the other vehicle emitting the vehicle sound is predicted to be present, an area which is enclosed by the elongated areas and is on the street indicated by the map information.

With these configurations, even when it is not possible to accurately detect the value of the vehicle sound due to the influence of surrounding noise, it is possible to accurately determine the sound source location by specifying the sound source location using the information about the location of the street supplementary and limiting the sound source location to the location of the street. In addition, even when it was not possible to accurately determine the attenuation amount of the sound pressure by diffraction because only a value of the sound pressure in part of a frequency band is detected due to the influence of the surrounding noise, it is possible to accurately determine the sound source location by limiting the sound source location to the location of the street.

Moreover, the value of the vehicle sound at the sound source location stored by the sound pressure storage unit may be updated by learning. For example, when there is an error in a sound source location and a location of a street, the value of the vehicle sound at the sound source location stored by the sound pressure storage unit may be updated by learning so that the sound source location corresponds to the location of the street. With this, the value of the vehicle sound at the sound source location stored by the sound pressure storage unit becomes more accurate; and thus it is possible to accurately determine the sound source location.

It is to be noted that the present invention can be implemented not only as a vehicle location detection device including such characteristic elements but also as a vehicle location detection method having the elements included in the vehicle location detection device as steps and as a program causing the vehicle location detection device or a computer to execute the steps. It goes without saying that such a program can be distributed through a computer-readable recording medium such as a CD-ROM (Compact Disc-Read Only Memory) and a communication network such as the Internet.

The present invention makes it possible to specify the location of the other vehicle even if the other vehicle is hidden behind the obstacle.

With this, for instance, when the present invention is applied to prevent a collision at an intersection having poor visibility, it is possible to separately present an approaching other vehicle in a blind spot and another vehicle in a blind spot and still at a far distance, and thus safe driving is ensured.

FURTHER INFORMATION ABOUT TECHNICAL BACKGROUND TO THIS APPLICATION

The disclosure of Japanese Patent Application No. 2009-158281 filed on Jul. 2, 2009 including specification, drawings and claims is incorporated herein by reference in its entirety.

The disclosure of PCT application No. PCT/JP2010/004330 filed on Jul. 1, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 is a diagram illustrating sound pressure information according to Embodiment 1;

FIG. 4 is a diagram illustrating specification of vehicle areas according to Embodiment 1 (a table showing relationships between sound pressures and distances);

FIG. 14 is a diagram showing an example of vehicle sound pressure information according to Embodiment 2;

FIG. 24 is a diagram showing an example of vehicle sound pressure information according to a modification of Embodiment 2;

DESCRIPTION OF THE PREFERRED EMBODIMENT(S)

The following describes the embodiments of the present invention with reference to the drawings.

Although a vehicle location detection device according to the present invention is characterized by specifying a location of another vehicle even if the other vehicle (vehicle in a blind spot) is hidden behind an obstacle which may block propagation of a vehicle sound, as a matter of course, the vehicle location detection device successfully specifies the location of the other vehicle even when there is no such an obstacle. Accordingly, for the facilitation of understanding, a method for specifying a location of another vehicle when there is no obstacle is first described as Embodiment 1, and a method for specifying a location of another vehicle when there is an obstacle is then described as Embodiment 2.

Embodiment 1

The following describes a vehicle location detection device according to Embodiment 1 of the present invention. Here, described is a method for specifying a location of another vehicle when there is no obstacle.

Figure 1:
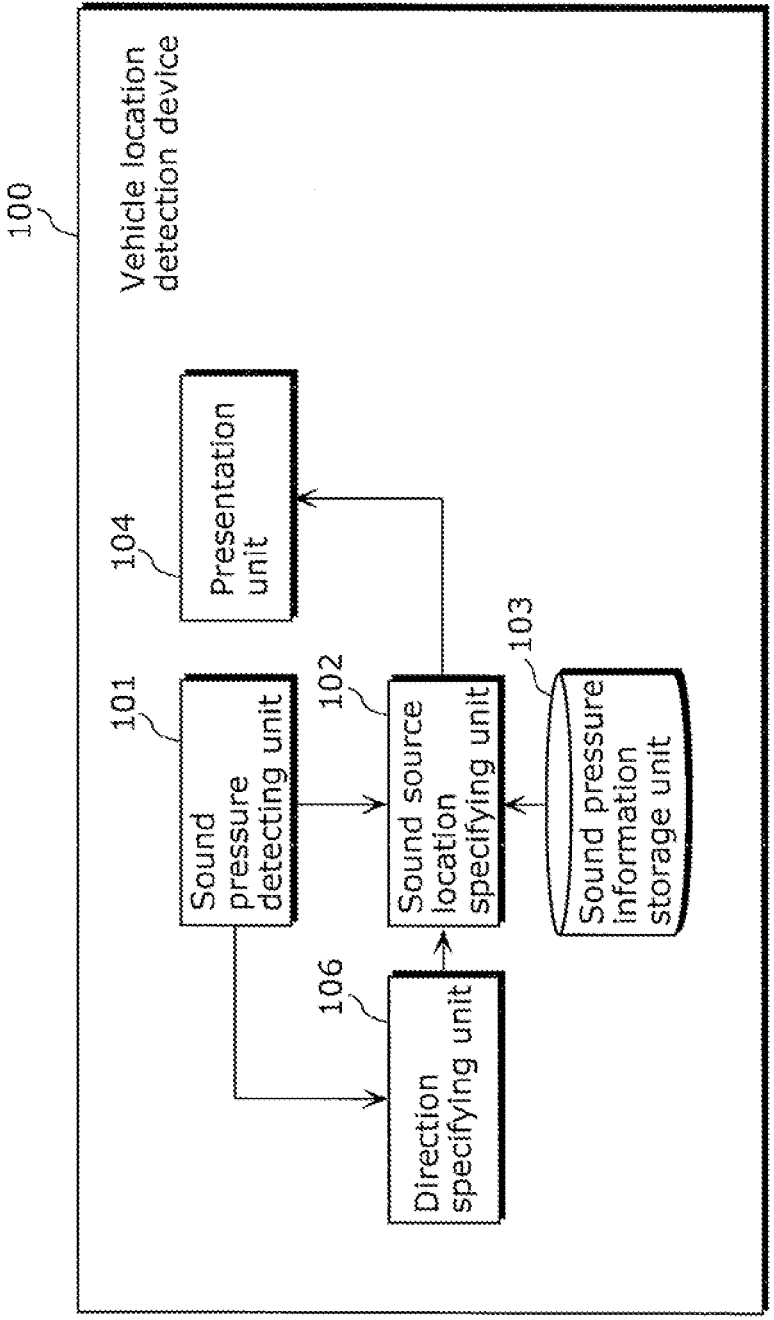
FIG. 1 is a block diagram showing a vehicle location detection device according to Embodiment 1.

FIG. 1 is a block diagram showing an entire structure of a vehicle location detection device 100 according to Embodiment 1 of the present invention. The vehicle location detection device 100 according to Embodiment 1 of the present invention is mounted in a vehicle, is a device which detects locations of other vehicles near the vehicle, and includes a sound pressure detecting unit 101, a sound source location specifying unit 102, a sound pressure information storage unit 103, a presentation unit 104, and a direction specifying unit 106.

The sound pressure detecting unit 101 includes microphones and the like, and detects a value of a sound pressure of another vehicle (i.e., a sound pressure of a vehicle sound arriving at a vehicle) at a detection location (i.e., the location of the vehicle). Here, examples of the other vehicle include a motorcycle and an automobile near the vehicle, and examples of the vehicle sound include an engine sound of the motorcycle and the automobile, a road noise, a honk, a siren of an emergency vehicle, and a signal sound emitted by an electric automobile. It is to be noted that although a configuration of the sound pressure detecting unit 101 may be realized by microphones which detect a sound and a processing unit which specifies a sound pressure based on the detected sound, the following description is based on an assumption that the sound pressure detecting unit 101 is configured by only the microphones.

Figure 2:
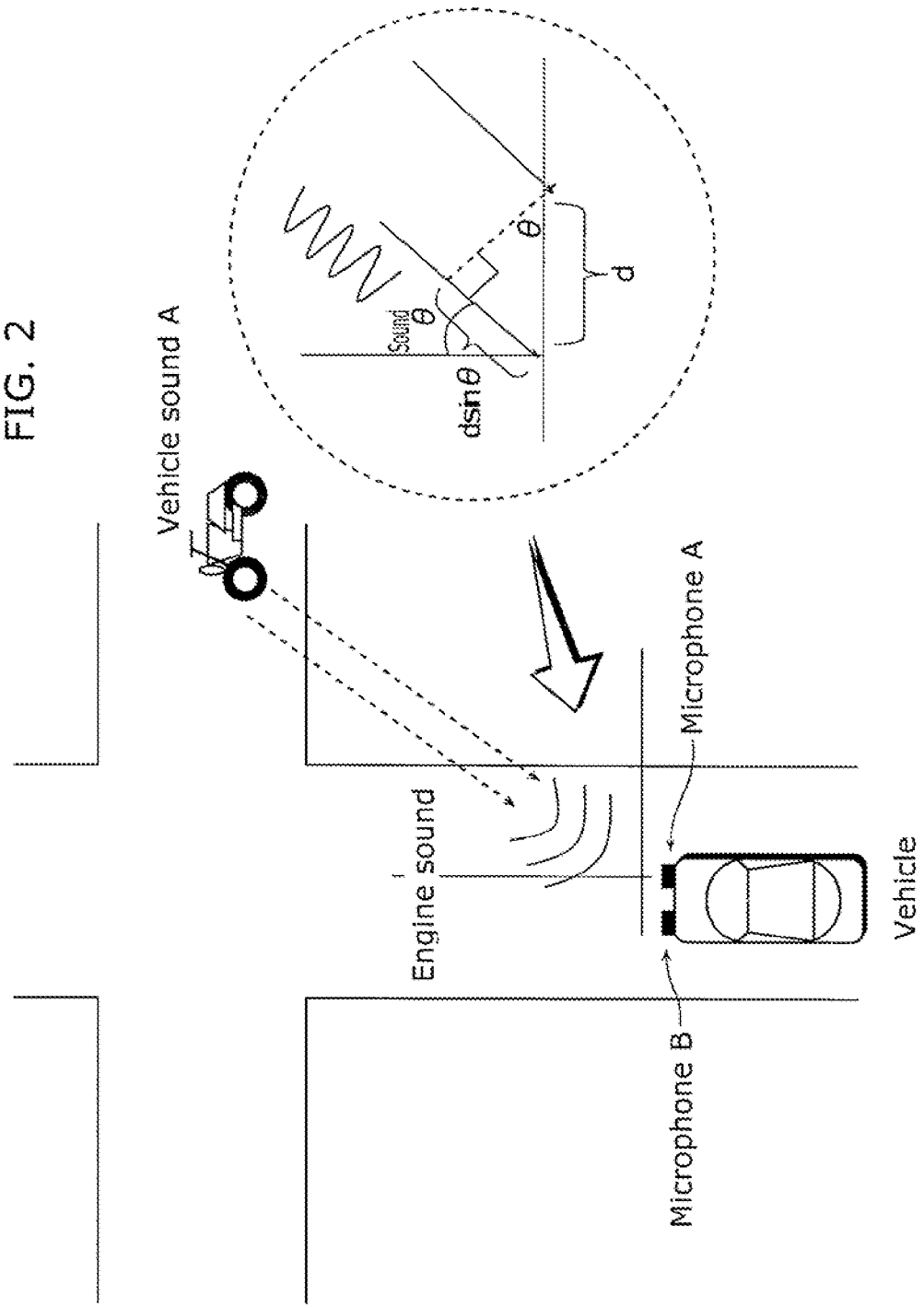
FIG. 2 is a diagram illustrating detection of a vehicle sound according to Embodiment 1.

FIG. 2 is a diagram illustrating a method for detecting a vehicle sound. Microphones A and B are examples of the sound pressure detecting unit 101 provided to an anterior bumper of a vehicle. In an example of FIG. 2, there is a vehicle A (hereinafter, a vehicle detected by the vehicle location detection device 100 is also referred to as a detected vehicle) approaching an intersection from the right, the microphone A detects the sound pressure of 52 dB of an engine sound of the vehicle A.

The direction specifying unit 106 is a processing unit which specifies an arrival direction of a vehicle sound. For example, the direction specifying unit 106 specifies a direction of a vehicle sound based on a difference in arrival times of a sound detected by the microphones A and B. As shown by the example in FIG. 2, here, the two microphones (microphones A and B) are provided as the sound pressure detecting unit 101 to the anterior bumper of the vehicle. The direction specifying unit 106 specifies a sound source direction of the vehicle A based on a difference in arrival times of a vehicle sound detected by the two microphones, the sound pressure detecting unit 101. It is possible to calculate the difference in the arrival times by calculating a mutual correlation between the two microphones.

FIG. 2 is a diagram further illustrating a method for specifying a direction of a vehicle sound. A distance between the microphones A and B is assumed to be d (m). As shown by the example in FIG. 2, it is assumed that the engine sound of the vehicle A (motorcycle) is detected from a direction θ (radian) with respect to a traveling direction of the vehicle. Where a difference in arrival times between the microphones is Δt(s) and a sonic speed is c(m/s), the direction θ (radian) can be expressed by Equation 1 as below.

[Math. 1]

$$\theta = \sin^{-1}(\Delta t c/d) \quad \text{(Equation 1)}$$

In the case of the example in FIG. 2, for instance, the direction specifying unit 106 specifies that the direction of the vehicle sound is on the right at an angle of 45 degrees with respect to the vehicle.

It is to be noted that, in Embodiment 1, because the same microphones can be used for detecting a sound pressure value of a vehicle sound at a detection location and a direction of the vehicle sound, there are effects of simplification of a system, simplification of processing, and cost reduction.

Furthermore, a direction in which another vehicle is present may be specified such that the direction ranges, for instance, from an angle of 45 to 60 degrees. Although the direction in which the other vehicle is present is theoretically determined to be one direction, there is an error in the direction in which the other vehicle is present because there is an error in a difference in arrival times of a sound under an actual environment. When, for example, the direction is specified at predetermined time intervals such as 100 ms, there is a case where a detection angle may vary between 45 and 60 degrees inclusive. Thus, a direction which is specified at the predetermined time intervals and has a range of the minimum to maximum value is a specified direction. A direction of a sound source may be specified such that the direction of the sound source ranges, for instance, from the angle of 45 to 60 degrees.

The sound pressure information storage unit 103 is, for example, a memory which stores information indicating a sound pressure value of a vehicle sound at a location (sound source location) at which another vehicle that is a sound source is present (hereinafter, in the information is referred to as vehicle sound pressure information). In Embodiment 1, a sound pressure is stored as a value represented by a sound pressure level (dB) with a reference sound pressure being 20 μPa.

FIG. 3 is a diagram showing an example of vehicle sound pressure information about a vehicle sound at a sound source location stored in the sound pressure information storage unit 103. Here, a range (low sound pressure and high sound pressure) of an average (general) sound pressure of each of various vehicles is stored. In the diagram, vehicle sound pressure information about a vehicle, like a 400 cc motorcycle, is shown.

It is to be noted that an experimental result showed that a value of a sound pressure at the time of idling (1200 rpm) at a sound source location of a motorcycle sound was about 68 dB. In addition, the experimental result showed that a value of a sound pressure immediately before shifting at the time of accelerating (e.g., 5000 rpm) was about 78 dB. In Embodiment 1, as shown in FIG. 3, it is assumed that a value of a sound pressure of a vehicle sound at a sound source location which has, for instance, a range of 68 to 78 dB is stored. The reason for this is that storing the value having the range allows accurate specification of an area where another vehicle is present because the sound pressure varies.

The sound source location specifying unit 102 is a processing unit which calculates a distance from the vehicle to the other vehicle, based on the sound pressure of the other vehicle and the vehicle sound pressure information stored in the sound pressure information storage unit 103, and specifies an area where the other vehicle that is the sound source is present. A relationship between attenuation of the sound pressure and a distance (distance between a sound source location and a sound detection location; here, the distance between the vehicle location and the other vehicle location) is calculated to specify the area where the other vehicle is present.

A sound pressure at a sound source location is assumed to be p(0). Since the sound pressure is inversely proportional to the square of a distance, where a distance from the sound source location to a point at which a sound is detected is r (m) and a coefficient is k, a sound pressure p(r) at the detection point r (m) can be expressed by Equation 2 as below.

[Math. 2]

$$p(r)=p(0)/(k*r*)  \quad \text{Equation 2)}$$

Thus, assuming that the sound pressure p(r) is represented by decibel P (dB), the sound pressure p(r) can be expressed by Equation 3 as below.

[Math. 3]

$$P(r)=10 \log p(r)=10 \log(p(0))-10 \log(k*r*r) \quad \text{(Equation 3)}$$

Figure 5:
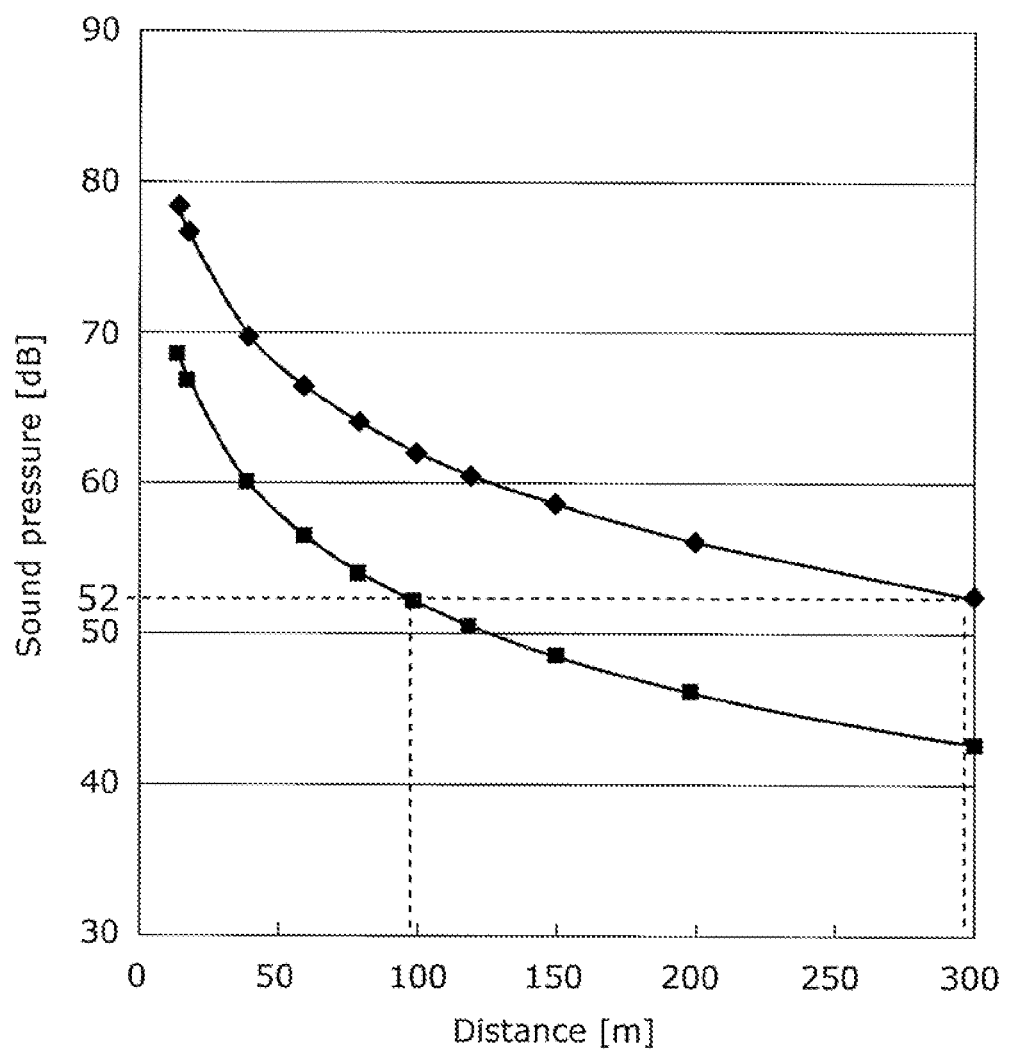
FIG. 5 is a diagram illustrating the specification of the vehicle areas according to Embodiment 1 (curves showing the relationships between the sound pressures and the distances)

FIG. 4 is a table showing, with respect to a sound pressure at each of sound source locations, a sound pressure at a location at a predetermined distance such as 15 m, 18 m, and so on. Here, sound pressures calculated according to Equation 3 are illustrated. For example, when a sound pressure at a sound source location is 78 dB, a sound pressure at a location at the distance of 18 m is 77 dB, a sound pressure at a location at the distance of 40 m is 70 dB, and a sound pressure at a location at the distance of 100 m is 62 dB. When the sound pressure at the sound source location is 68 dB, the sound pressure at the location at the distance of 18 m is 67 dB, the sound pressure at the location at the distance of 40 m is 60 dB, and the sound pressure at the location at the distance of 100 m is 52 dB. FIG. 5 is a graph showing these sound pressures and distances. In the graph, the horizontal axis indicates a distance from a sound source, the vertical axis indicates a sound pressure at a location at the distance, and a variation of a sound pressure with respect to each of distances when sound pressures at a sound source location are 78 dB and 68 dB is shown. It is clear that a sound pressure is attenuated according to a distance. For instance, when a sound pressure at a detection location is 52 dB (a horizontal broken line), it is possible to estimate a distance between a sound source location and the detection location in the following manner: the sound source location is a point at the distance of 300 m, assuming that a sound pressure at the sound source location is 78 dB (a high sound pressure of the motorcycle); and the sound source location is a point at the distance of 100 m, assuming that a sound pressure at the sound source location is 68 dB (a low sound pressure of the motorcycle).

Figure 6:
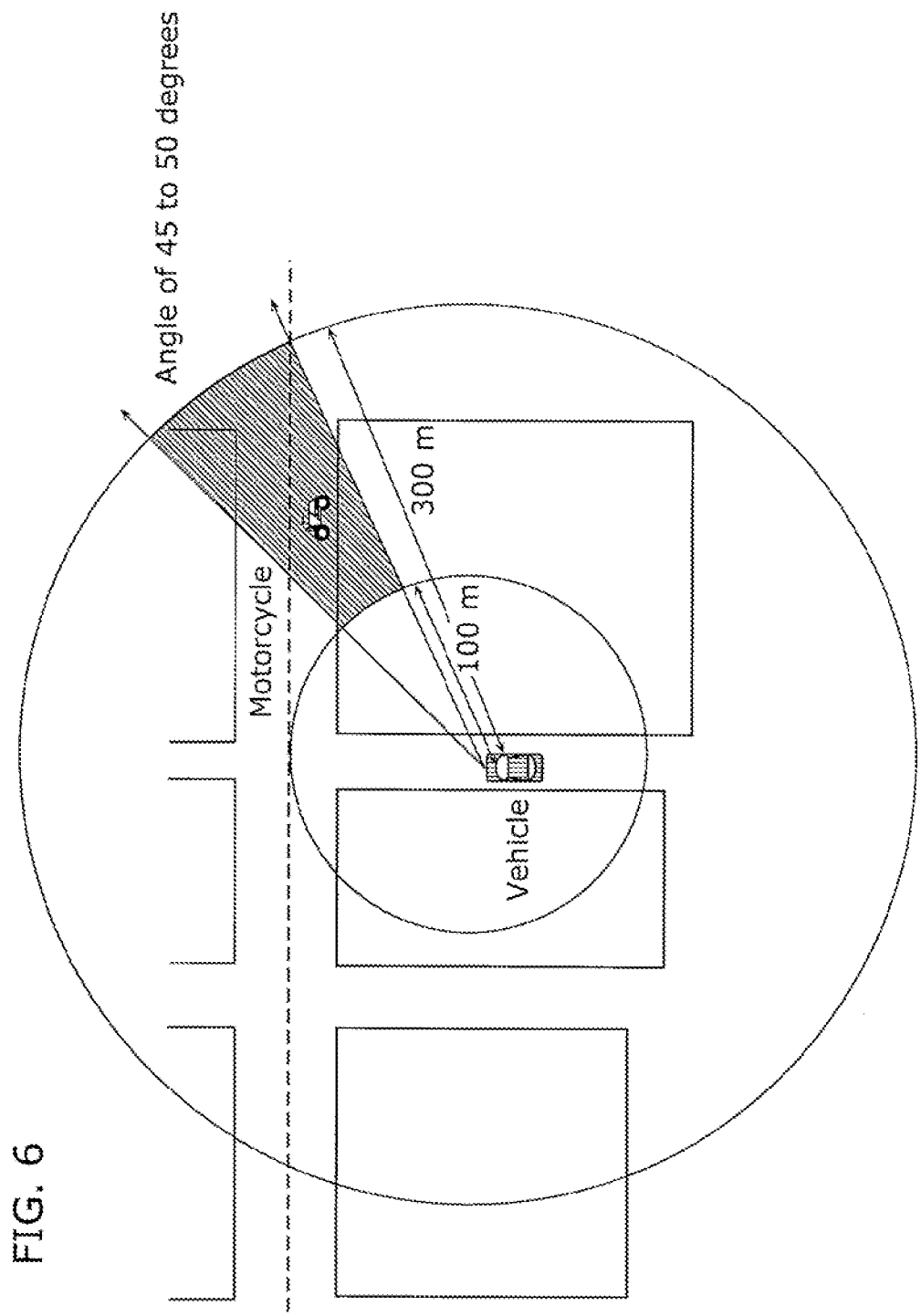
FIG. 6 is a diagram illustrating specification of a vehicle area according to Embodiment 1 (a diagram showing a specified vehicle area)

FIG. 6 is a diagram showing specification of a vehicle area. Illustrated is a relationship between a location of a vehicle (hereinafter, referred to as a vehicle location) and a location of a motorcycle. In the case of Embodiment 1, as shown in FIG. 3, the sound pressures of 68 dB and 78 dB at a sound source location of the motorcycle are accumulated as vehicle sound pressure information. In contrast, the sound pressure of 52 dB is detected at the vehicle location by the sound pressure detecting unit 101. In this case, based on Equations 2 and 3, the sound source location specifying unit 102 successfully specifies that the motorcycle is at a point at the distance of about 100 to 300 m from the vehicle location. Furthermore, the direction specifying unit 106 specifies that a sound source direction is on the right at the angle of 45 to 50 degrees. Thus, the sound source location specifying unit 102 specifies that the motorcycle is present in an area (a range marked with diagonal lines in FIG. 6) on the right at an angle of 45 to 50 degrees with respect to the vehicle and at the distance of 100 to 300 m from the vehicle location.

The presentation unit 104 is a processing unit which presents the location of the motorcycle specified by the sound source location specifying unit 102. Here, the presentation unit 104 is a display or a speaker which presents that the motorcycle is present in the area specified by the sound source location specifying unit 102.

Figure 7:
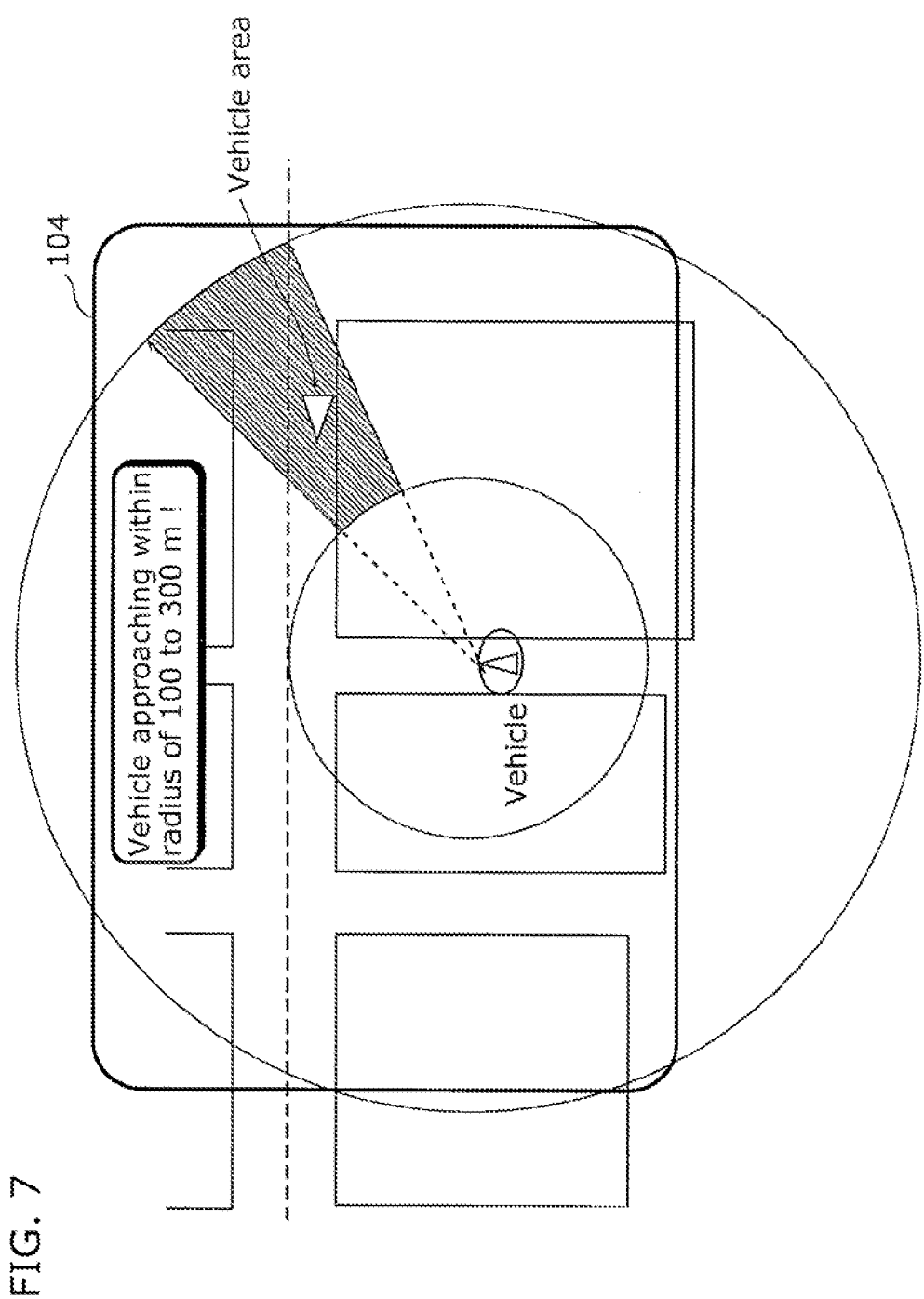
FIG. 7 is a diagram showing a presentation example of the specification of the vehicle area according to Embodiment 1.

FIG. 7 is a diagram showing a presentation example by the presentation unit 104. The presentation unit 104 is, for instance, a display screen of a car navigation apparatus. FIG. 7 shows the vehicle and map information about a surrounding area. Because the sound source location specifying unit 102 has specified that the motorcycle is present within the radius of 100 to 300 m, the presentation unit 104 notifies, through visual and audio warning, a user that a vehicle is approaching within the radius of 100 to 300 m. Moreover, as shown by the diagonal lines in FIG. 6, because the area where the motorcycle is present has been specified, the presentation unit 104 shows an area marked with diagonal lines which is on the screen of the car navigation apparatus.

Figure 8:
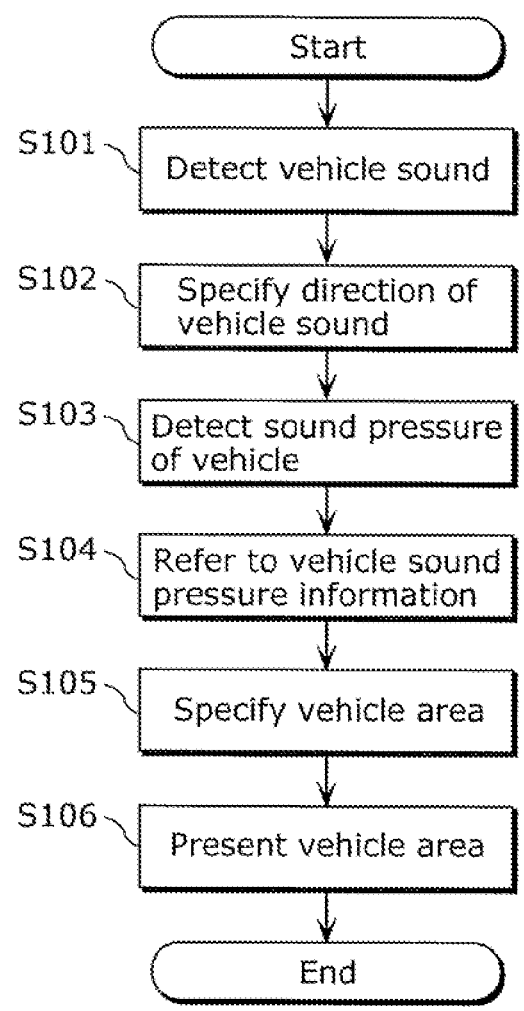
FIG. 8 is a flowchart showing operations of the vehicle location detection device according to Embodiment 1.

FIG. 8 is a flowchart showing operations of the vehicle location detection device 100 according to Embodiment 1.

First, the microphones (sound pressure detecting unit 101) detect a vehicle sound of another vehicle (Step S101). Then, the direction specifying unit 106 calculates a difference in arrival times of the vehicle sound, based on the vehicle sound detected by the microphones A and B (sound pressure detecting unit 101), and specifies a direction in which the other vehicle is present (Step S102). In the meantime, the microphone A or B (sound pressure detecting unit 101) detects a sound pressure of the vehicle sound (Step S103). Subsequently, the sound source location specifying unit 102 refers to a sound pressure at a present location (sound source location) of the other vehicle which is included in vehicle sound pressure information accumulated in the sound pressure information storage unit 103 (Step S104). Then, the sound source location specifying unit 102 calculates a distance from the vehicle to the other vehicle, based on the detected sound pressure and the sound pressure at the present location (sound source location) of the other vehicle, and specifies an area where the other vehicle is present, based on the calculated distance and the direction in which the other vehicle is present (Step S105). Finally, the presentation unit 104 presents the specified area where the other vehicle is present (Step S106).

A sequence of detecting the sound pressure of the vehicle sound and specifying the area where the other vehicle is present includes the above steps. In the present invention, the sound pressure of the vehicle sound is detected with a predetermined timing, the area where the other vehicle is present is specified by repeating the sequence, and a change of the specified area is displayed on, for instance, the screen of the car navigation apparatus in an animated manner. The following describes in detail the presentation example.

Although the sound pressure detected by the sound pressure detecting unit 101 is 52 dB in the example shown in FIG. 2, it is assumed that a sound pressure detected after elapse of a predetermined time is 64 dB.

Figure 9:
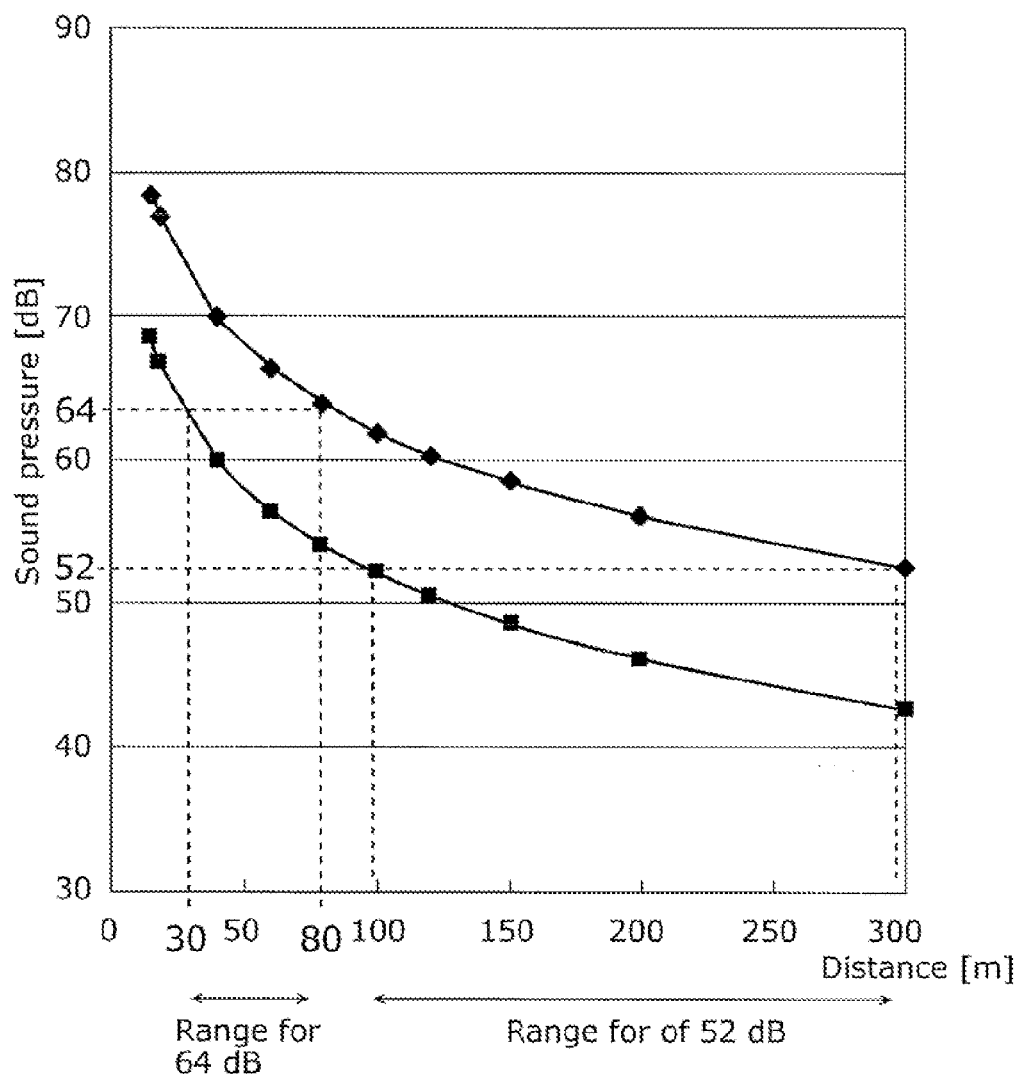
FIG. 9 is a diagram illustrating the specification of the vehicle areas according to Embodiment 1 (the curves showing the relationships between the sound pressures and the distances)

It is to be noted that a sound source direction is at the same angle of 45 to 60 degrees as previously described. Similar to FIG. 5, FIG. 9 is a graph showing relationships between sound pressures and distances (each of which is a distance from the vehicle location to the other vehicle location). When a detected sound pressure is 64 dB (one of horizontal broken lines in FIG. 9), the distance from the vehicle location to the other vehicle location is 30 m, assuming a sound pressure at a sound source location is 78 dB (the high sound pressure of the motorcycle); and the distance is 80 m, assuming that a sound pressure at the sound source location is 68 dB (the low sound pressure of the motorcycle). Accordingly, it is clear that the increase of the detected sound pressure from 52 to 62 dB narrows a range of the distance from the vehicle location to the other vehicle location (the range of the distance corresponding to a range from the low sound pressure to the high sound pressure of the motorcycle).

Figure 10:
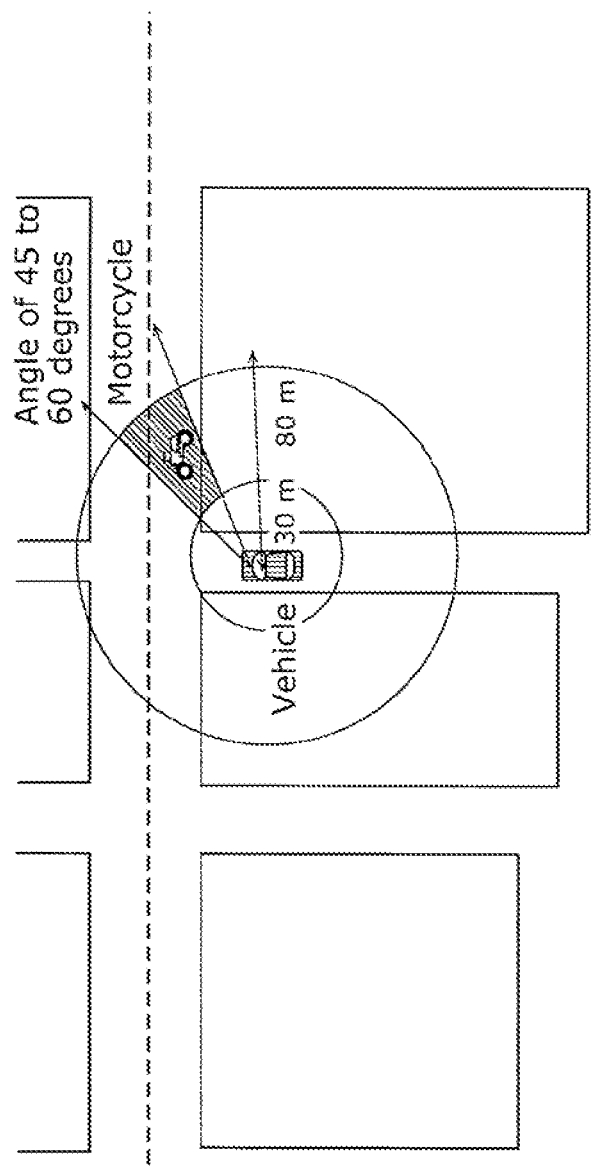
FIG. 10 is a diagram showing a specific example of specification of a vehicle-area according to Embodiment 1.

Similar to FIG. 6, FIG. 10 is a diagram showing specification of a vehicle area. In this example, the sound source location specifying unit 102 successfully specifies that the motorcycle is at a point at the distance of about 30 to 80 m. Furthermore, the direction specifying unit 106 specifies that a sound source direction is on the right at the angle of 45 to 60 degrees. Thus, the sound source location specifying as unit 102 specifies that the motorcycle is present in an area (a range marked with diagonal lines in FIG. 10) on the right at the angle of 45 to 60 degrees with respect to the vehicle and at the distance of 30 to 80 m from the vehicle location.

Figure 11:
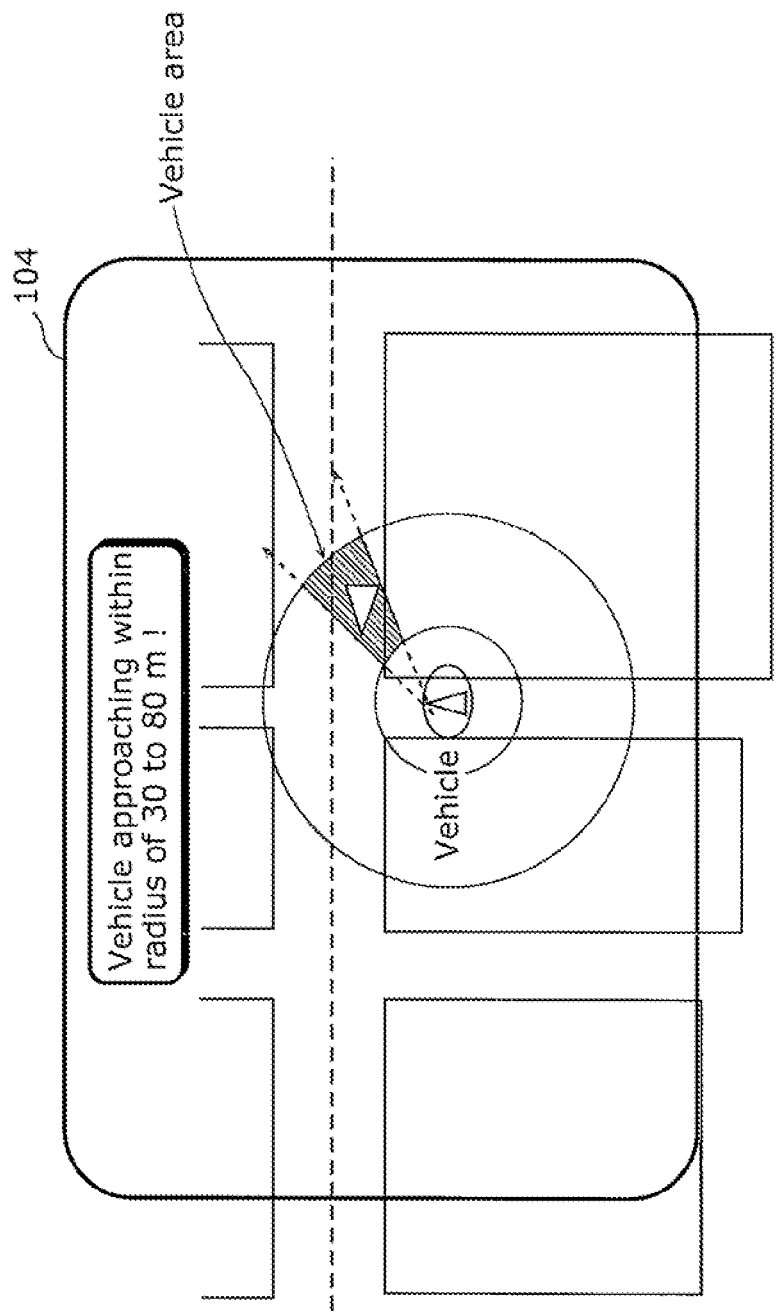
FIG. 11 is a diagram showing a presentation example of the specification of the vehicle area according to Embodiment 1.

FIG. 11 is a diagram showing a presentation example by the presentation unit 104. Because the sound source location specifying unit 102 has specified that the motorcycle is present within the radius of 30 to 80 m, the presentation unit 104 notifies, through visual and audio warning, the user that a vehicle is approaching within the radius of 30 to 80 m. Moreover, as shown by the diagonal lines in FIG. 10, because the area where the motorcycle is present has been specified, the presentation unit 104 shows an area marked with diagonal lines which is on the screen of the car navigation apparatus.

Comparison between FIGS. 7 and 11 shows that the vehicle area shown in FIG. 11 is narrowed. This is because a sound pressure to be detected varies as the detected vehicle approaches and an area to be specified (here, the range of the distance corresponding to a sound pressure range from the low sound pressure to the high sound pressure of the motorcycle) changes with the variation of the sound pressure. For instance, although an area where the motorcycle is present is wide when the motorcycle is still at a far distance, the area narrows as the motorcycle approaches the vehicle and the narrowed area is specified in a limited way, and thus it is possible to visually and dynamically perceive the change.

It is to be noted that although, in Embodiment 1, the sound pressure at the other vehicle location is accumulated as decibel information and the distance between the vehicle location and the other vehicle location is calculated by the sound source location specifying unit 102 using the decibel information, the present invention is not limited to such specification of the sound source location. For example, as shown by the table in FIG. 4, distances respectively corresponding to detected sound pressures may be calculated in advance and a range of the calculated distances may be accumulated. This produces an effect of reduction in calculation costs. Moreover, it is not always necessary to accumulate such relationships between the detected sound pressures and the distances, and the relationships may be obtained from, for instance, a server apparatus via a wireless network. For example, every time a sound source location corresponding to a detected sound pressure is specified, the sound source location is not necessarily the same due to a situation of each intersection or surrounding buildings. Thus, a distance to a sound source corresponding to a sound pressure detected at each intersection may be obtained from the server apparatus.

Embodiment 2

The following describes a vehicle location detection device according to Embodiment 2 of the present invention.

Embodiment 2 describes a method for specifying an area where a vehicle in a blind spot is hidden behind an obstacle.

Figure 12:
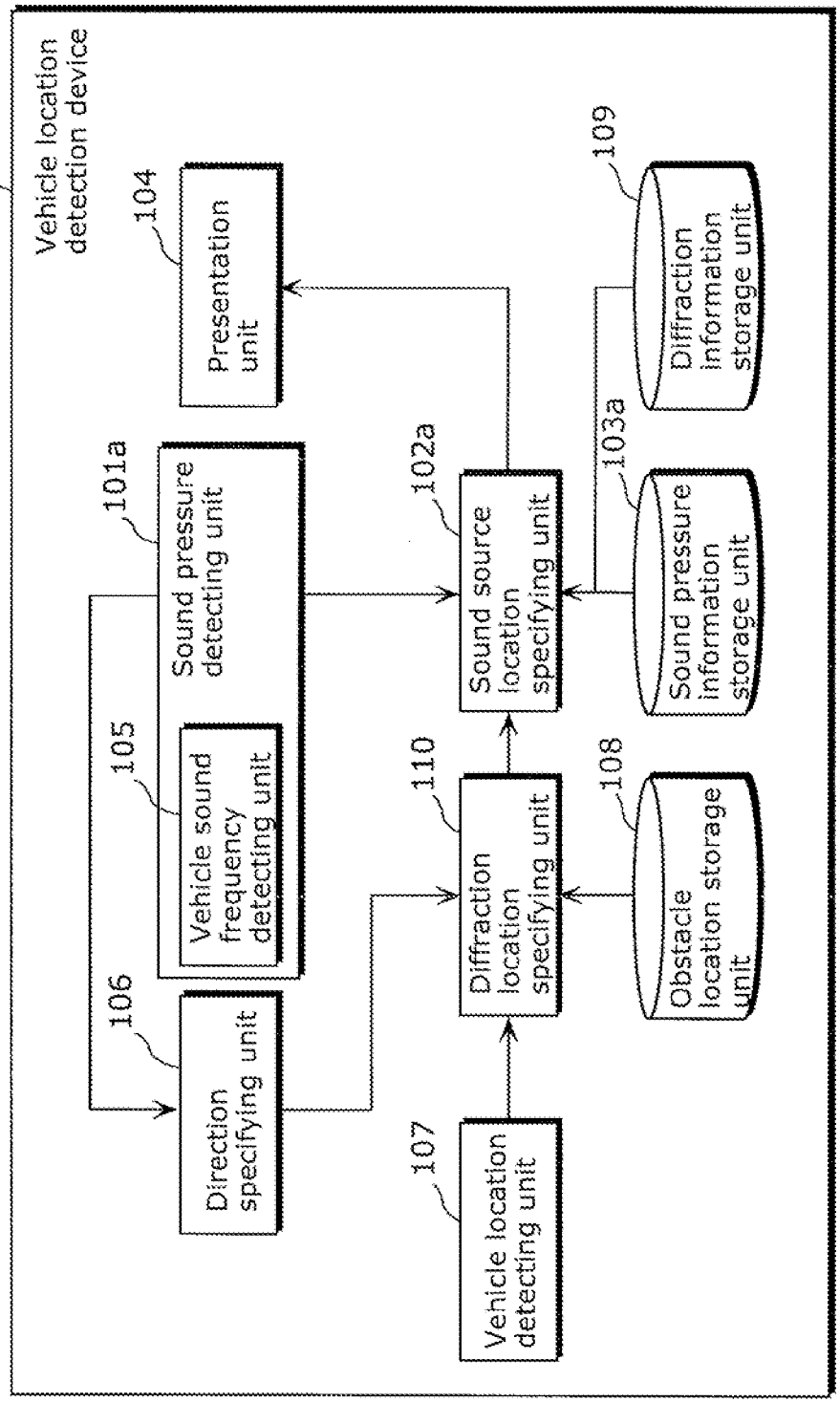
FIG. 12 is a block diagram showing a vehicle location detection device according to Embodiment 2.

FIG. 12 is a block diagram showing a vehicle location detection device 200 according to Embodiment 2. The vehicle location detection device 200 is mounted in a vehicle, is a device which detects locations of vehicles near the vehicle, and includes a sound pressure detecting unit 101a, a sound source location specifying unit 102a, a sound pressure information storage unit 103a, a presentation unit 104, a vehicle sound frequency detecting unit 105, a direction specifying unit 106, a vehicle location detecting unit 107, an obstacle information storage unit 108, a diffraction information storage unit 109, and a diffraction location specifying unit 110. Hereinafter, the same reference signs are given to elements that are the same as those in Embodiment 1, and differences from Embodiment 1 are mainly described below.

As in Embodiment 1, the sound pressure detecting unit 101a includes microphones which detect a sound pressure of another vehicle, but differs from the sound pressure detecting unit 101 according to Embodiment 1 in that the sound pressure detecting unit 101a has the vehicle sound frequency detecting unit 105 which performs frequency resolution on a vehicle sound and detects a frequency.

Like the sound pressure information storage unit 103 according to Embodiment 1, the sound pressure information storage unit 103a is, for instance, a memory which stores vehicle sound pressure information. However, here, the sound pressure information storage unit 103a accumulates, as the vehicle sound pressure information, for each frequency, information about a general sound pressure at a sound source location. The following describes frequencies and sound pressures with reference to the drawings.

It has been conventionally known that a speech sound uttered by a person can be roughly divided into vowels having periodicity and consonants having no periodicity. In contrast, it is considered that a sound emitted by a vehicle is composed of a mixture of (i) an engine sound which varies in connection with an engine speed and the number of cylinders and has periodicity and (ii) a noise which depends on a road noise generated by friction between a tire and a road surface, air resistance, a fan, and so on.

The engine sound has a characteristic similar to that of the human vowel. In other words, regardless of types of Japanese vowel such as "a" and "i", a frequency of the engine sound increases depending on the engine speed, like a pitch of a speech sound increases as the speech sound becomes a high pitch sound, and the engine sound has a harmonic structure of a fundamental frequency. A fundamental frequency F can be approximated by Equation 4 as below, using, for example, an engine speed (rpm), the number of cylinders (piston chambers) s, and a coefficient k.

(Math. 4)

$$F = k \times \frac{\text{rpm}}{60} \times \frac{s}{2}$$ (Equation 4)

In contrast, the road noise and the like do not necessarily depend on the fundamental frequency F, show a characteristic at a relatively high frequency, and can be considered as the consonant in terms of the speech sound uttered by the person. Although it is relatively difficult to determine a sound pressure of a sound source in advance since the road noise and the like vary depending on a traveling speed or a road surface condition, the engine sound is suitable for specifying the sound pressure of the sound source since the engine sound depends on the engine speed. Thus, the engine sound among sounds emitted by the vehicle is used in Embodiment 2.

Figure 13B:
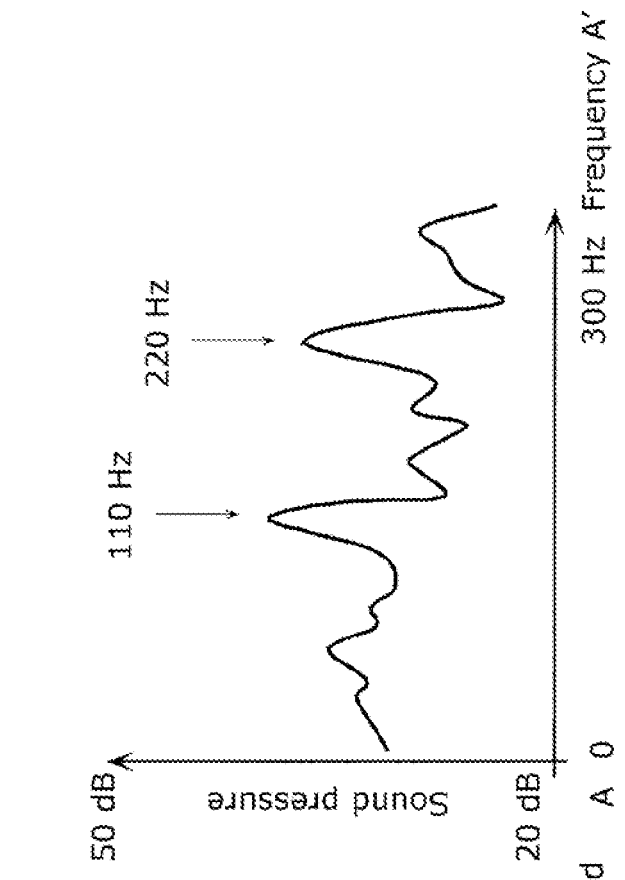
FIGS. 13A and 13B are diagrams showing a frequency characteristic of a vehicle sound according to Embodiment 2.
Figure 13A:
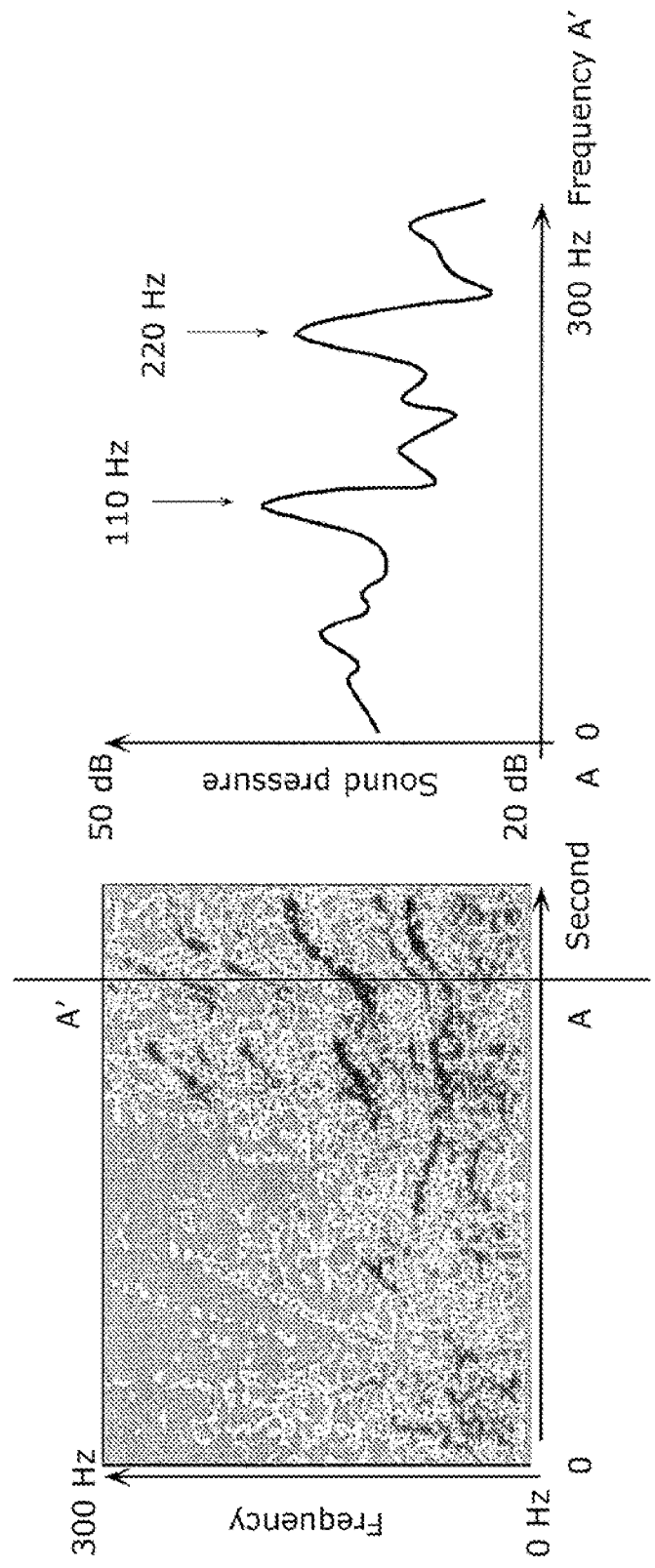

FIG. 13A is a diagram showing an example of time variation of data obtained by performing frequency resolution on an engine sound of a motorcycle which has started traveling (has increased an engine speed). In the diagram, the horizontal axis indicates a traveling time, and the vertical axis indicates a frequency. A magnitude of a sound pressure is represented by the depth of a color. FIG. 13B shows a relationship (frequency spectrum) between a frequency (the horizontal axis) and a sound pressure (the vertical axis) at a timing (A-A') shown in FIG. 13A.

It is considered that a sound emitted by a vehicle is composed of a combination of a fundamental frequency and a random noise such as a white noise. The sound including the fundamental frequency has a harmonic structure in which a peak appears at a frequency and at twice, three times, and so on of the frequency. The fundamental frequency varies from vehicle to vehicle depending on a structure, size, material, and the number of cylinders of an engine, and increases as an engine speed increases.

For instance, as shown in FIG. 13B, the engine sound of the motorcycle has the fundamental frequency of 110 Hz, and a harmonic structure having a sound pressure peak at 220 Hz and so on. As shown in FIG. 13A, it is clear that the fundamental frequency and the peak position (frequency) in a harmonic varies according to the engine speed.

FIG. 14 is a diagram showing vehicle sound pressure information accumulated in the sound pressure information storage unit 103a. A result of an experiment in which a frequency characteristic is detected by varying an engine speed of a motorcycle from about 1100 rpm at idling to about 4000 rpm shows a frequency characteristic from about 100 Hz to the neighborhood of about 130 Hz. Furthermore, like Embodiment 1, when the sound pressure of the engine sound at the sound source location is 68 dB, the result shows that a sound pressure having the frequency of 100 Hz to the neighborhood of 130 Hz is 38 dB as expressed in a sound pressure level.

Accordingly, in Embodiment 2, the sound pressure information storage unit 103a accumulates, as vehicle sound pressure information, the frequency of 100 to 130 Hz of a vehicle sound and the sound pressure range of 38 dB of the frequency.

Moreover, the sound pressure information storage unit 103a accumulates, as vehicle sound pressure information having a harmonic structure, the frequency of 200 to 260 Hz and the sound pressure range of 37 dB of the frequency. It is to be noted that although frequency information is accumulated as vehicle information (information for identifying a vehicle) in Embodiment 2, assuming that a frequency represents a motorcycle, a sound pressure may be corresponded to a vehicle type instead of the frequency and stored.

Furthermore, based on the values thus obtained from the experiment, the sound pressure information storage unit 103a accumulates, as vehicle sound pressure information, the frequency of 40 to 60 Hz of a vehicle sound of an automobile and the sound pressure range of 35 dB of the frequency. This is because the engine speed of the automobile is slower than the motorcycle, and the fundamental frequency of the automobile is low.

Figure 15:
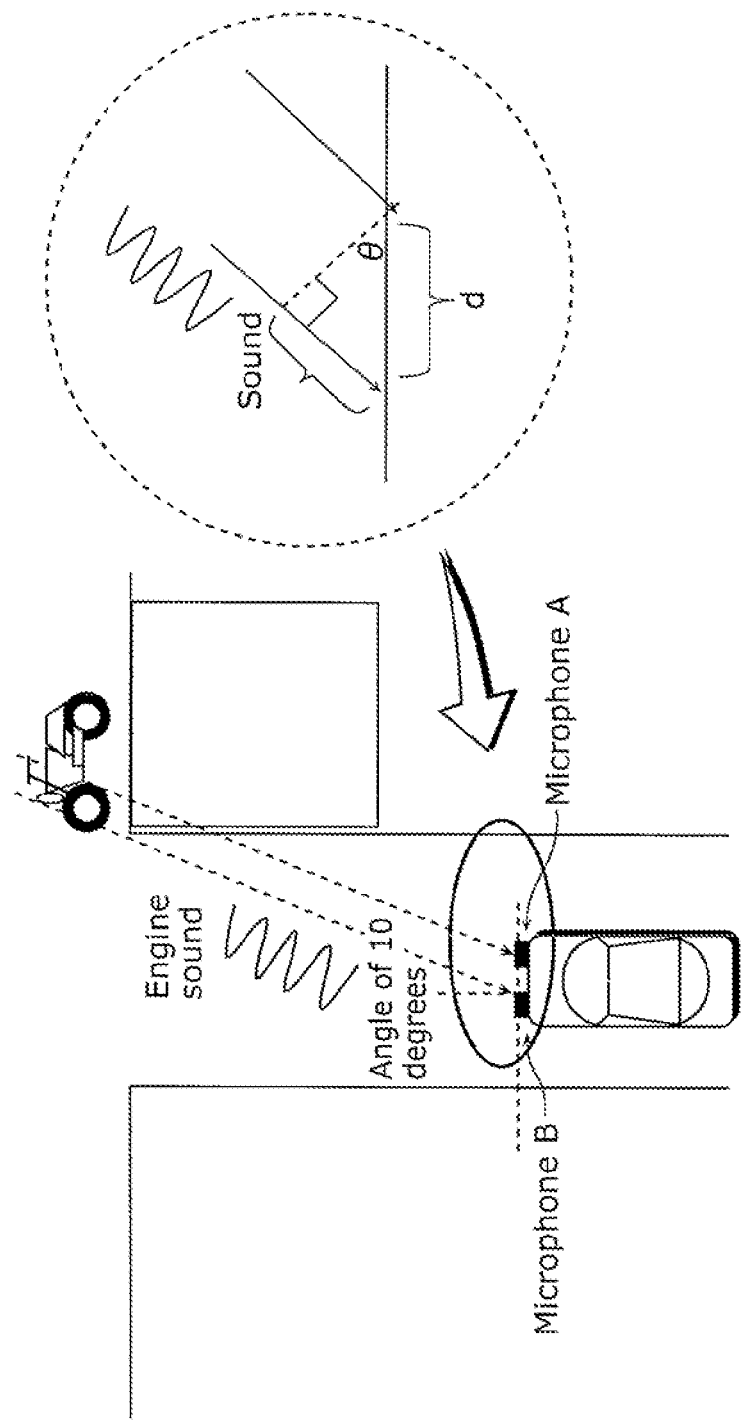
FIG. 15 is a diagram illustrating detection of a vehicle sound according to Embodiment 2.

FIG. 15 is a diagram illustrating detection of a vehicle sound. Here, the sound pressure detecting unit 101a detects a vehicle sound of the other vehicle, and the vehicle sound frequency detecting unit 105 detects that a sound pressure having the frequency of 110 Hz is 10 dB and a sound pressure having the frequency of 220 Hz is 6 dB. Moreover, the direction specifying unit 106 detects that a sound source direction of the vehicle sound is on the right at the angle of 10 degrees with respect to the vehicle, based on a difference in arrival times of the vehicle sound at the microphones A and B.

The obstacle information storage unit 108 is, for instance, a hard disk which accumulates obstacle information indicating geographical locations of obstacles which are likely to block propagation of the vehicle sound, that is, information about the locations of the obstacles.

Figure 16:
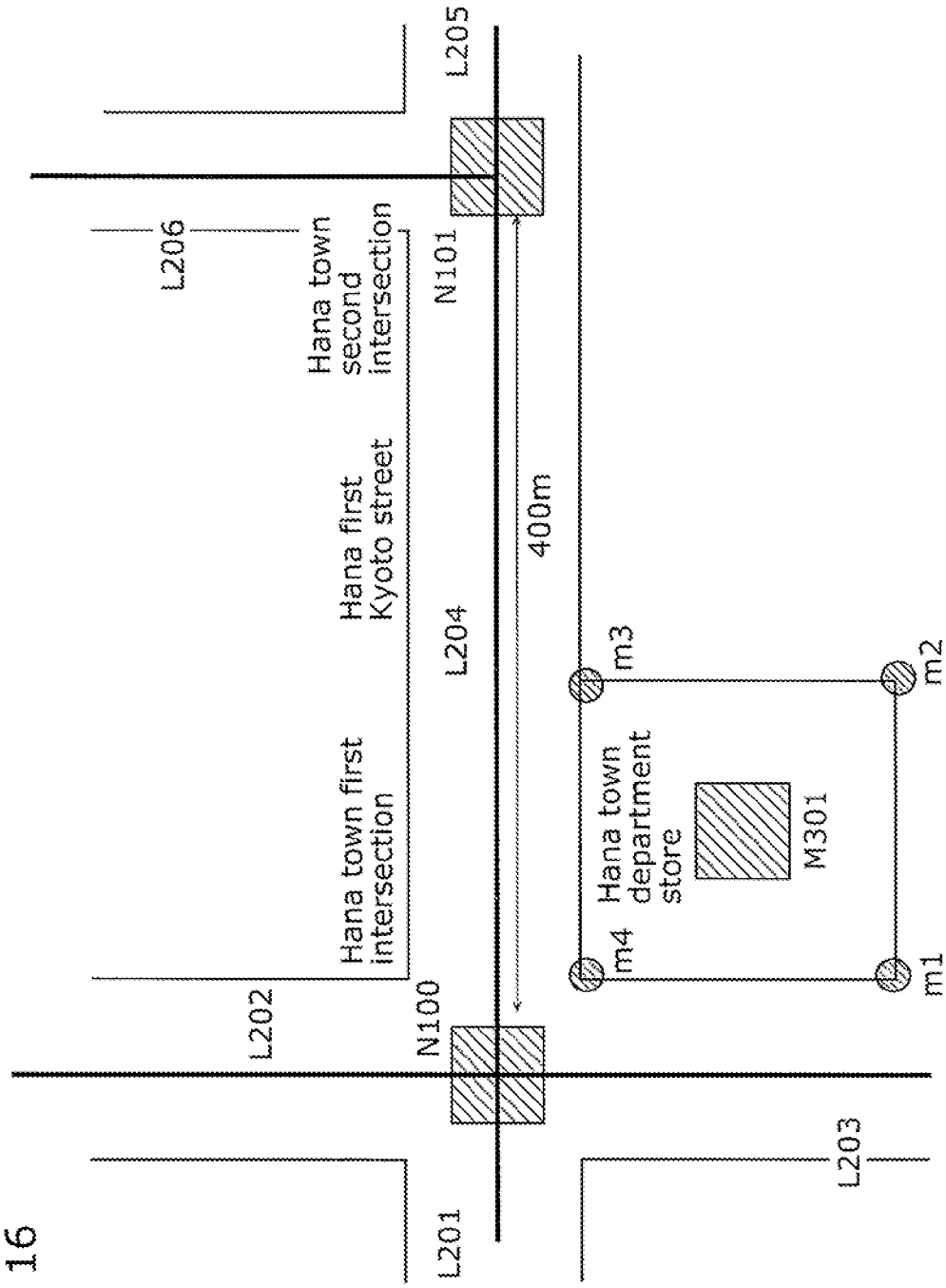
FIG. 16 is a diagram illustrating contents of obstacle information according to Embodiment 2.

FIG. 16 is a diagram illustrating accumulated information about obstacles. Generally, map information accumulated in the car navigation apparatus or the like includes information about facilities and landmarks or street network information in which each intersection or each facility is one node and routes are further structured with links each connecting the node to one of the nodes. FIG. 16 shows "N100 (a node)" corresponding to Hana town first intersection; and "N101" corresponding to Hana town second intersection. The information shown in FIG. 16 also includes connection information about nodes and links which shows, for instance, that Hana first Kyoto street, which is a route connecting Hana town first and second intersections, is "L204 (a link)" and "N100" is connected by links "L201 to L204". The information shown in FIG. 16 further includes information about lengths of links which shows, for example, a distance between "Hana first and second intersections", that is, a distance of L204 is 400 m. FIG. 16 shows "M301 (a mark)" corresponding to Hana town department store as a landmark such as a facility and a building. Moreover, the information shown in FIG. 16 includes, as the map information according to Embodiment 2, points of shape m1 to m4 which indicate a range of a facility, and includes information which shows, for instance, that a distance between the points of shape m1 and m2 is 100 m. In Embodiment 2, landmarks such as facilities and buildings are obstacles which diffract sounds, and the obstacle information storage unit 108 stores, as the information about the obstacles, information about landmarks. This is because buildings registered as such facilities in the map information are often tall and tend to diffract vehicle sounds. On the other hand, in the case of low-rise buildings such as private homes, sounds often arrive from above roofs of the low-rise buildings. Thus, whether or not a building is an obstacle may be determined based on information about heights of buildings. For example, a building having a height above a predetermined threshold (e.g., 5 m) is determined as an obstacle, but when the building has the height below the threshold, a sound source direction may be specified because diffraction is not necessarily considered (i.e., a sound pressure attenuation amount by diffraction is 0).

Figure 17:
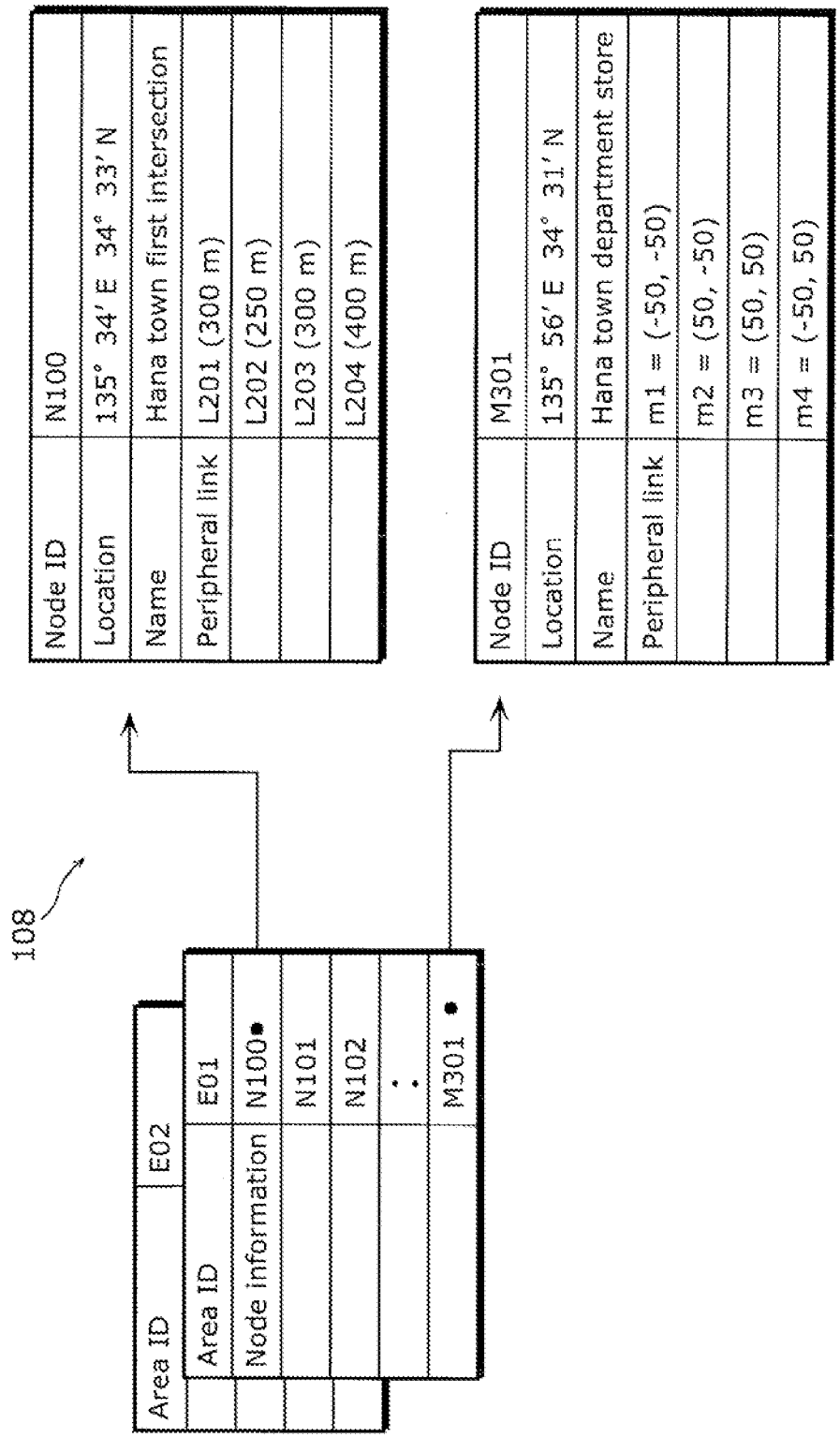
FIG. 17 is a diagram illustrating data examples of the obstacle information according to Embodiment 2.

FIG. 17 is a diagram showing, as an example of the obstacle information, an example of the street network information accumulated as the map information of the car navigation apparatus or the like. A map is generally divided into predetermined areas, and information about nodes such as facilities and intersections in each area and links connecting the nodes is accumulated. Here, it is assumed that Area ID "E01" in FIG. 17 corresponds to an area shown in FIG. 16. "N100", "N101", and "M301" are accumulated as node in information for Area ID "E01". Further, information about each node and link information about connection to the node are accumulated. The node information "N100" shows location "135°34'E and 34°33'N", name "Hana town first intersection", and information about each link such as "L201" as a connection link and "L201" having the length of 300 m. Furthermore, the node information "M301" shows location "135°36'E and 34°31'N", name "Hana town department store", and points of shape each indicating a relative distance from, for instance, central node M301. For example, the point of shape m1=(−50, −50) is accumulated as a point of shape located, centering on "135°36'E and 34°31'N", at −50 m on the x-axis (east longitude) and −50 m on the y-axis (north latitude). The information about the landmark is the information about the obstacle.

The vehicle location detecting unit 104 is a processing unit which detects the vehicle location, which is the location of the vehicle. The vehicle location detecting unit 104 includes, for instance, a GPS.

The diffraction location specifying unit 110 is a processing unit which refers to the obstacle information stored in the obstacle information storage unit 108, and specifies a location of an obstacle in the direction specified by the direction specifying unit 106, based on the vehicle location detected by the vehicle location detecting unit 107. More specifically, the diffraction location specifying unit 110 is a processing unit which specifies, among obstacles indicated by the obstacle information stored in the obstacle information storage unit 108, an obstacle which is present in the direction specified by the direction specifying unit 106 and at a location having the shortest distance from the vehicle, and specifies the location of the specified obstacle as a diffraction location where the vehicle sound diffracts.

Figure 18:
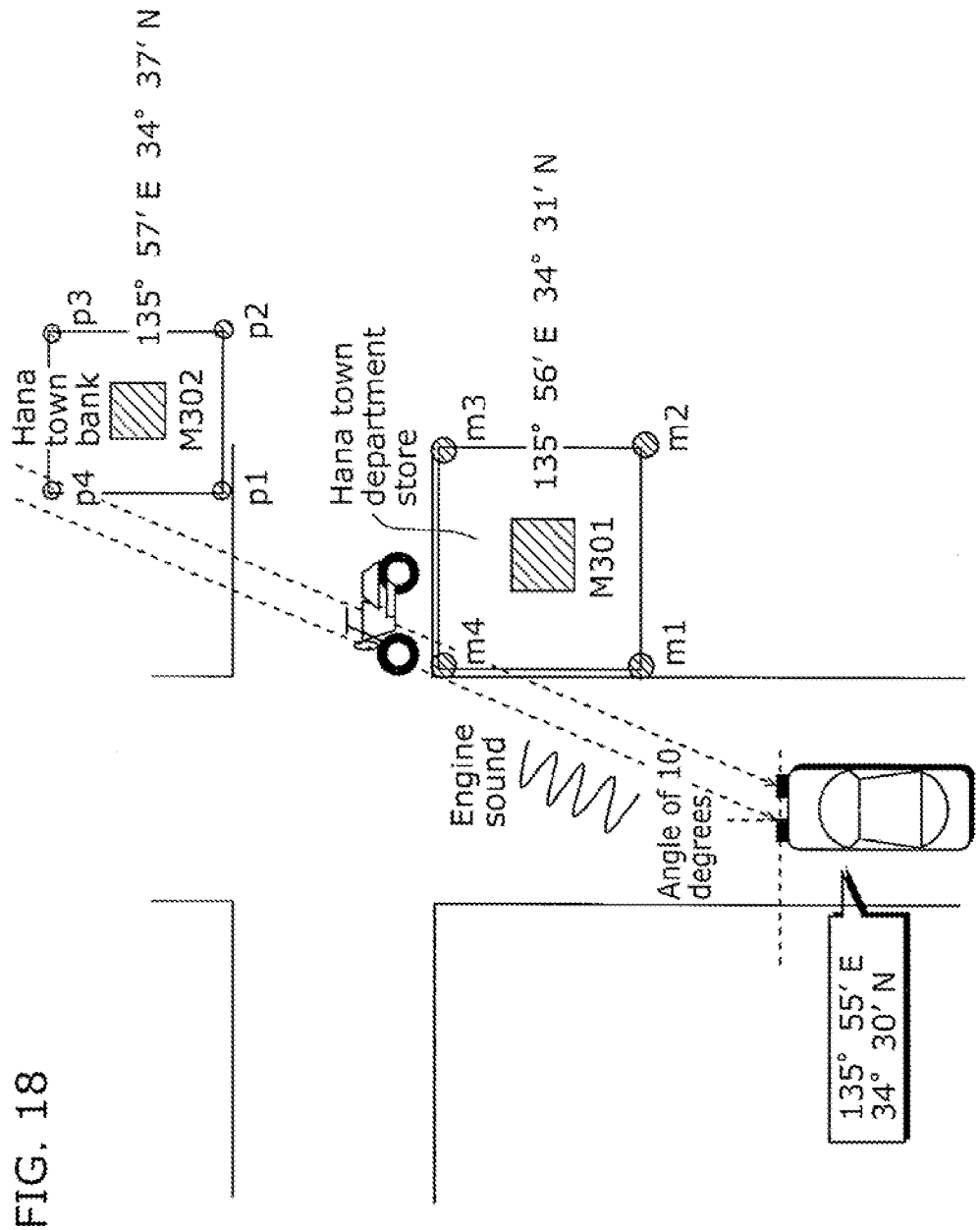
FIG. 18 is a diagram illustrating specification of locations of obstacles according to Embodiment 2.

FIG. 18 is a diagram illustrating specification of a diffraction location. Now, it is assumed that the vehicle location detecting unit 107 including the GPS has detected that latitude and longitude of the vehicle location are 135°55'E and 34°30'N. In addition, it is assumed that the direction specifying unit 106 has specified that a direction of a vehicle sound of another vehicle is on the right at the angle of 10 degrees.

On the other hand, location information about corners of an obstacle is accumulated as the obstacle information as shown in FIG. 17 and the like. The diffraction location specifying unit 110 determines whether or not the obstacle is present in a specified sound source direction with respect to the vehicle location, and specifies the obstacle having the shortest distance from the vehicle location. In the case shown in FIG. 18, the point of shape m4, one of corners of Hana town department store, is present in a direction on the right at the angle of 10 degrees with respect to the vehicle location. Further, although a point of shape p4, one of corners of Hana town bank, is also present on an extension of the direction on the right at the angle of 10 degrees, the diffraction location specifying unit 110 specifies the point of shape m4 as the obstacle because the point of shape m4 has the shortest distance from the vehicle location.

The diffraction information storage unit 109 accumulates, as information about an attenuation amount of a sound pressure at the time when a sound is diffracted by an obstacle, diffraction information indicating a relationship between an attenuation amount of a sound pressure and a positional relationship among a sound source, a diffraction point, and an observation point of a sound (i.e., a degree of diffraction) at the time when a sound is diffracted and propagated. In Embodiment 2, the diffraction information storage unit 109 accumulates, as an example of the diffraction information, diffraction information indicating a relationship between a path difference which the sound is attenuated depending on and an attenuation amount of a sound pressure, the path difference being a difference between a distance of a path from a sound source of a diffracted sound through a diffraction point to an observation point of a sound and a linear distance from the sound source to the observation point. It is known that a sound is attenuated more as the degree of diffraction (angle) is larger, and an attenuation amount of the sound by diffraction is greater as a frequency is higher. Thus, frequencies and attenuation amounts corresponding to the degree of diffraction are accumulated, as diffraction information, in association with each other. A specific value is calculated by generally using, for instance, Maekawa Chart shown in FIG. 19 and by Equation 5 as below.

Figure 19:
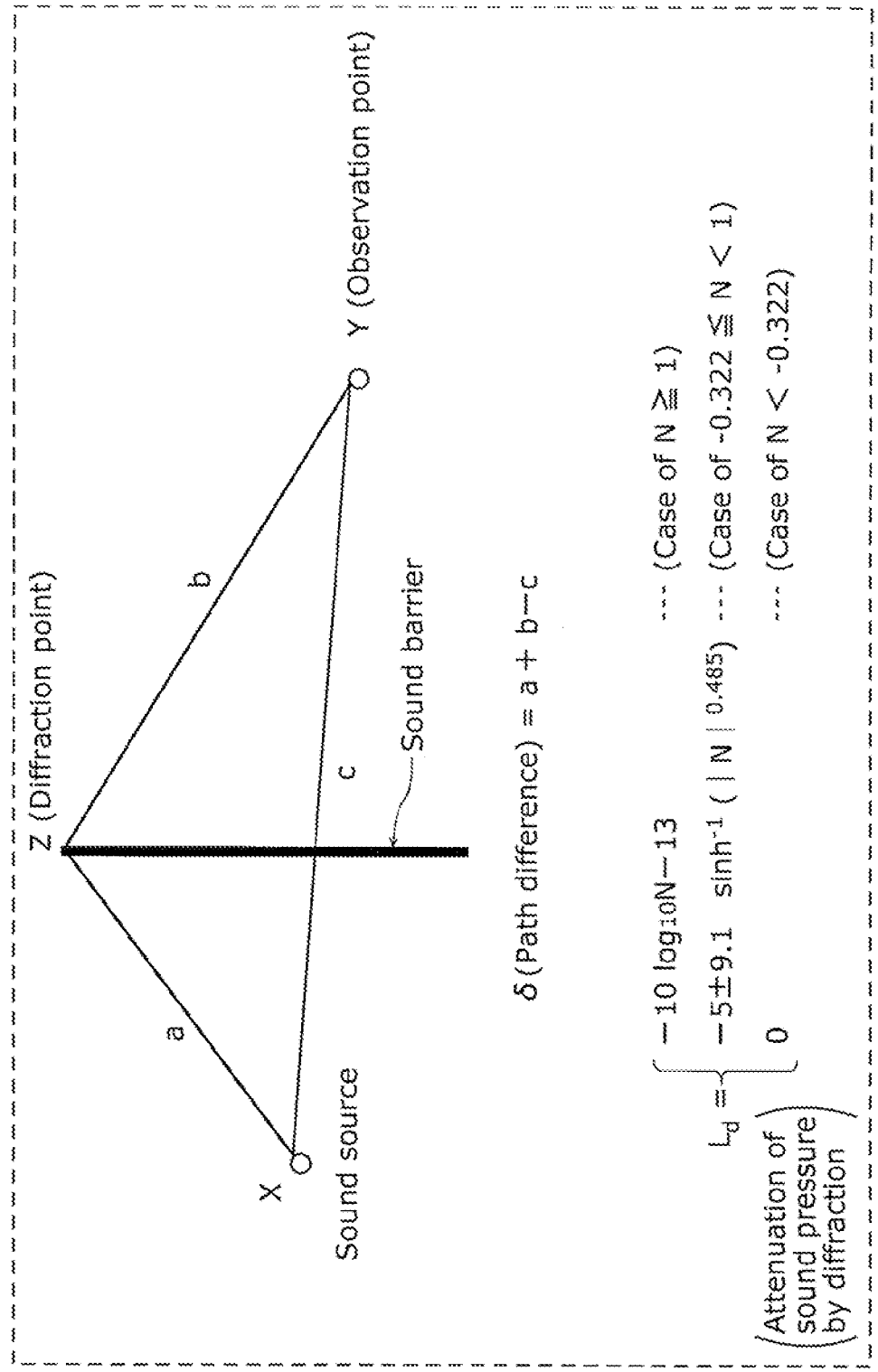
FIG. 19 is a diagram illustrating diffraction information according to Embodiment 2.

FIG. 19 is a diagram illustrating attenuation of a sound pressure by diffraction. It is assumed that an obstacle (here, "sound insulation wall" or the like) is between a sound source location X and a detection location Y of a sound (observation point of a sound), and the sound is diffracted at a location Z (diffraction point). In this case, where a path difference δ=between X and Z (distance a)+between Z and Y (distance b)−between X and Y (distance c), an attenuation amount Ld of a sound pressure by diffraction can be expressed by Equation 5 as below.

[Math. 5]

$$L_d = 10 \log_{10} N + 0.13 (N \geq 1)$$

$$L_d = 5 \pm 9.1 \sin h^{-1}(|N|^{0.485})(-0.322 \leq N < 1) \quad \text{(Equation 5)}$$

Here, N denotes the Fresnel number ($=2\delta/\lambda$), and λ denotes a frequency (Hz) of a vehicle sound. Of the ± sign in Equation 5, + sign indicates N<0, and − sign indicates N>0.

Figure 20:
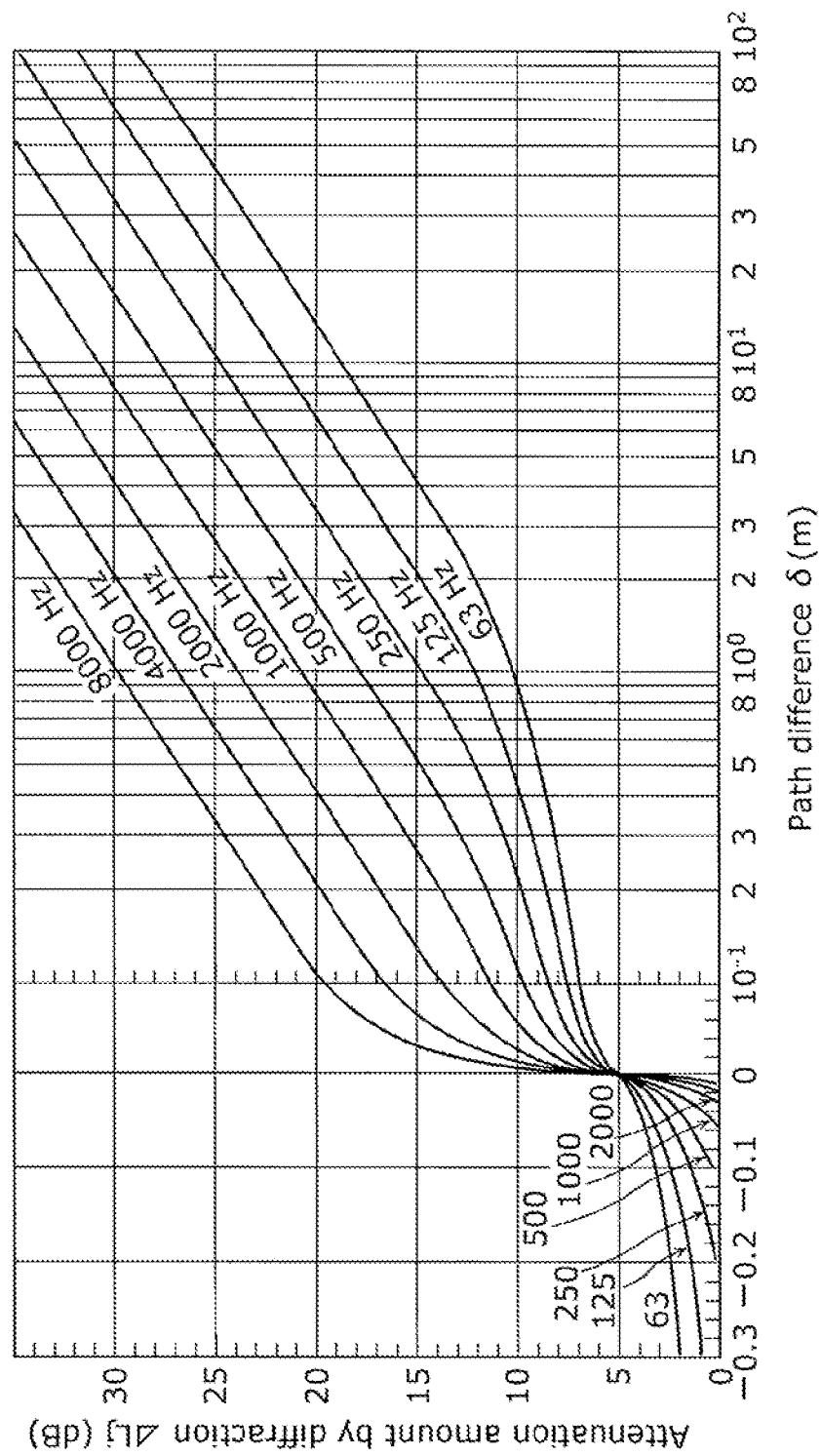
FIG. 20 is a diagram illustrating an example of diffraction information according to Embodiment 2.

FIG. 20 is a graph showing an example of diffraction information indicating frequencies and the attenuation amount (Ld) of a sound pressure, that is, a relationship between a path difference in each frequency and an attenuation amount of a sound pressure (see Non Patent Reference 1: Nihon Kenchiku Gakkai (Ed.), Jitsumu teki souon taisaku shishin oyohen (Tokyo: Gihodo Shuppan Co., Ltd., 1987, 14.)).

In the graph, it is clear that the attenuation amount increases as the path difference increases, since, for example, in the case of the frequency of 110 Hz, the attenuation amount is 15 dB when the path difference is 2 m, the attenuation amount is 21 dB when the path difference is 10 m, and the attenuation amount is 25 dB when the path difference is 20 m. In other words, it indicates that the greater the degree of diffraction from the obstacle is, the greater the attenuation amount of the sound pressure by the diffraction is.

From the above, where a sound pressure at a sound source location is P(0), in view of the attenuation amount Ld by diffraction, a sound pressure P(r) at a detection location at a distance of r(m) can be expressed by Equation 6 as below.

[Math. 6]

$$P(r)=10\log p(r)=10\log(p(0))-10\log(k^*r^*r)-L_d \quad \text{(Equation 6)}$$

To put it differently, a distance r is determined from attenuation by distance (the second term) and attenuation by diffraction (the third term), by assuming the sound pressure at the sound source location and detecting a difference in sound pressure from the sound pressure at the detection location, based on a rule shown in Equation 6.

Although the sound source location specifying unit 102a is a processing unit which specifies an area where the detected vehicle is present, in Embodiment 2, the sound source location specifying unit 102a specifies a location at which another vehicle emitting a vehicle sound is predicted to be present, by calculating an attenuation amount of a sound pressure of the vehicle sound by subtracting a sound pressure detected by the sound pressure detecting unit 101a (vehicle sound frequency detecting unit 105) from a sound pressure indicated by vehicle sound pressure information stored in the sound pressure information storage unit 103a and, assuming that the calculated attenuation amount includes an attenuation amount dependent on a propagation distance of the vehicle sound and an attenuation amount dependent on the degree of diffraction of the vehicle sound, by specifying a sound source location of the vehicle sound which is diffracted at a diffraction point that is an obstacle specified by the diffraction location specifying unit 110, based on a rule (Equation 6) indicating the calculated attenuation amount and the attenuation amount dependent on the propagation distance of the vehicle sound and a relationship (graph) indicated by diffraction information stored in the diffraction information storage unit 109.

More specifically, the sound source location specifying unit 102a specifies paths as paths of the vehicle sound at the time when Equation 6 and a relationship (graph) indicated by the diffraction information shown in FIG. 20 are satisfied and it is assumed that the diffraction occurs at the obstacle specified by the diffraction location specifying unit 110, specifies an elongated area by connecting sound source locations on the specified paths, and specifies, within the specified elongated area, a location at which the other vehicle emitting the vehicle sound is predicted to be present. At this time, the sound source location specifying unit 102a calculates, for a frequency detected by the vehicle sound frequency detecting unit 105, the attenuation amount of the sound pressure of the vehicle sound by subtracting a sound pressure corresponding to the frequency from the sound pressure indicated by the vehicle sound pressure information stored in the sound pressure information storage unit 103a. The following describes in detail a method for specifying a sound source location with reference to the drawings.

Figure 21:
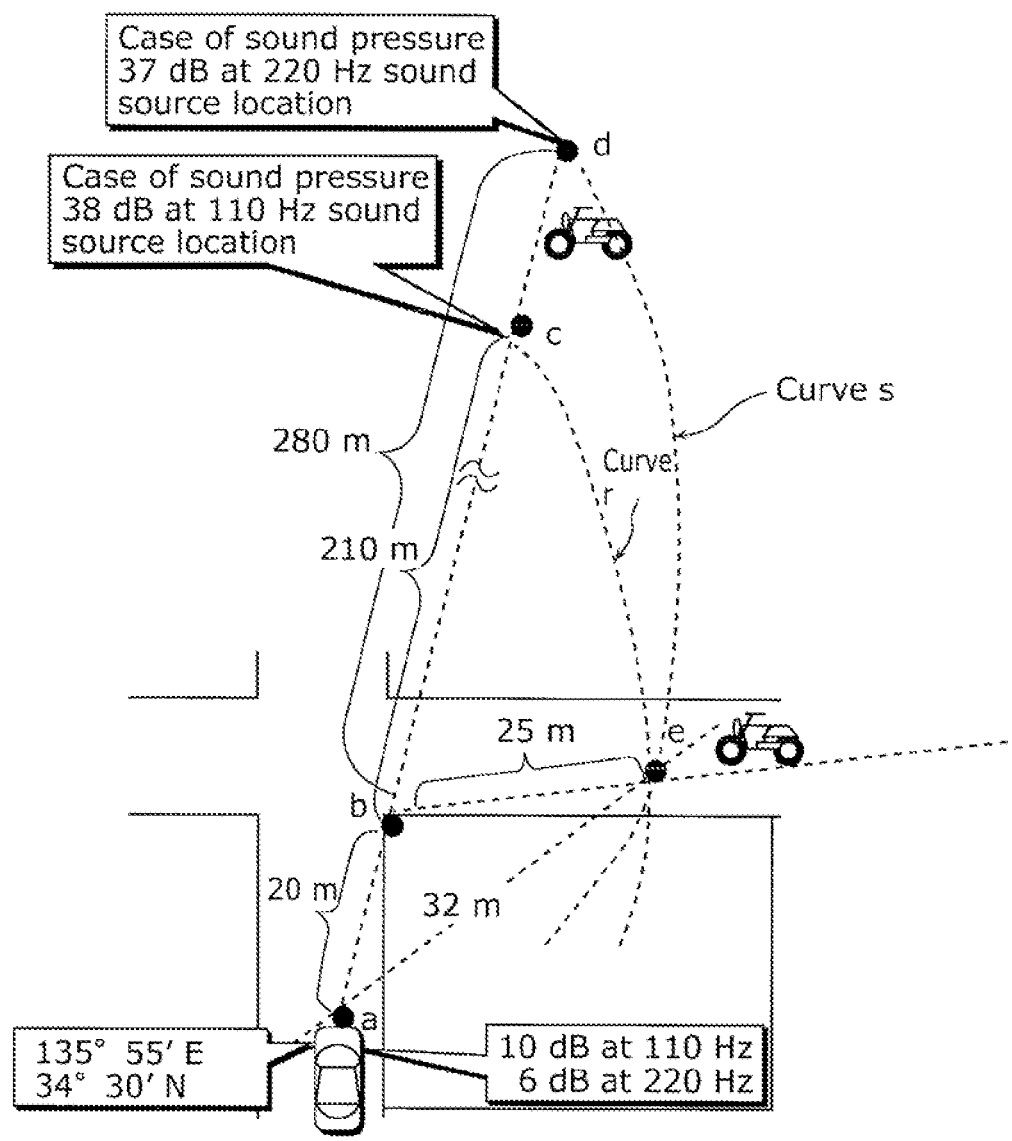
FIG. 21 is a diagram illustrating specification of a vehicle area according to Embodiment 2.

FIG. 21 is a diagram illustrating specification of a vehicle area. As shown in FIG. 21, it is assumed that the vehicle location detecting unit 107 has detected a location of a vehicle (location a). In addition, it is assumed that the microphones A and B included in the vehicle have detected the frequency of 110 Hz, the sound pressure of 10 dB of the frequency, and a sound source direction on the right at the angle of 10 degrees.

In this case, the diffraction location specifying unit 110 has specified that an obstacle (location b) is in the direction on the right at the angle of 10 degrees with respect to a traveling direction at the vehicle location (location a). It is to be noted that the vehicle location is a detection location used by the GPS (vehicle location detecting unit 107). It is also to be noted that, to be stricter, a location at which a microphone is attached may be the vehicle location. As shown in FIG. 21, when the obstacle is present in the sound source direction with respect to the vehicle location, the sound source location specifying unit 102a specifies, in view of attenuation of a sound pressure by diffraction, an area where another vehicle is present, based on Equation 6.

Stated differently, although the sound source direction has been detected on the right at the angle of 10 degrees, the sound source location specifying unit 102a specifies the area in view of diffraction of a sound because it can be considered that the sound has been diffracted by the obstacle.

The sound source location specifying unit 102a refers to the vehicle sound pressure information accumulated in the sound pressure information storage unit 103a, and specifies the area where the other vehicle is present, based on the frequency of the vehicle sound detected by the sound pressure detecting unit 101 (to be more specific, the vehicle sound frequency detecting unit 105) and the sound pressure of the vehicle sound. According to the vehicle sound pressure information, the frequency of 110 Hz corresponds to a range of 100 to 130 Hz (motorcycle), and the sound pressure is 38 dB (FIG. 14).

Thus, since it is clear that the sound pressure at the sound source location is 38 dB, the attenuation amount of the sound pressure is 28 dB (=38 dB−10 dB). Although the attenuation includes the attenuation by distance and the path difference by diffraction, here, assuming that there is almost no influence of the attenuation by diffraction, that is, assuming that the sound source is on a linear extension from the vehicle location to the obstacle, a distance to the sound source is about 230 m based on Equation 6, and it is possible to predict that a location c is the sound source location in FIG. 21. As the path difference increases (i.e., the diffraction becomes greater), the attenuation amount by diffraction increases but the distance to the sound source decreases. For instance, when the sound source location is a location e (a point on a street closest and perpendicular to the traveling direction of the vehicle), a distance between the vehicle (location a) and the obstacle (location b) is 20 m, a distance between the obstacle (location b) and the sound source location (location e) is 25 m, and a linear distance between the sound source and the vehicle location is about 32 m, based on the graph shown in FIG. 20 and Equation 6. As stated above, when ratios each between the attenuation amount dependent on the propagation distance of the sound included in the attenuation amount of the calculated sound pressure and the attenuation amount dependent on the degree of diffraction of the sound are assumed, the path of the sound from the sound source location to the detection location is calculated for each of the assumed ratios, based on Equation 6 and the graph shown in FIG. 20 (satisfying both of Equation 6 and the graph shown in FIG. 20), and the sound source location is specified, an elongated area (curve r) including the locations c and e is a location where the sound source having the frequency of 110 Hz is predicted to be present.

Moreover, the microphones A and B have detected the frequency of 220 Hz and the sound pressure of 6 dB of the frequency. Likewise, since it is clear from the vehicle sound pressure information shown in FIG. 14 that the sound pressure at the sound source location is 37 dB, the attenuation amount of the sound pressure is 31 dB (=37 dB−6 dB). Assuming that the sound source is on a linear extension from the vehicle location to the obstacle, the distance to the sound source is about 300 m, and it is possible to predict that a location d is the sound source location in FIG. 21.

On the other hand, when the sound source location is the location e (the point on the street closest and perpendicular to the traveling direction of the vehicle), a distance between the vehicle (location a) and the obstacle (location b) is 20 m, a distance between the obstacle (location b) and the sound source location (location e) is 25 m, and a linear distance between the sound source and the vehicle location is about 32 m, based on the graph shown in FIG. 20 and Equation 6. As stated above, when the distance between the sound source location and the detection location is calculated based on Equation 6 and the graph shown in FIG. 20, an elongated area (curve s) including the locations d and e is a location where the sound source having the frequency of 220 Hz is present. In Embodiment 2, the sound source location specifying unit 102a specifies that the other vehicle is present at an intersection point e where the curves r and s intersect with each other (an area where the two elongated areas overlap with each other).

The curves r and s means that although the sound source is at a far distant location because the detected sound pressure is small with respect to the sound pressure at the sound source location, the distance to the sound source becomes shorter because the influence of the attenuation by distance becomes smaller as the attenuation by diffraction caused by the influence of the obstacle becomes greater, that is, the path difference becomes greater. This indicates that it can be considered that the sound source is in the area such as the curves r and s shown in FIG. 21. In contrast, although the sound source location differs between the locations d and c having a relatively small path difference because the attenuation by diffraction becomes greater as the frequency becomes higher, it is indicated that the intersection point is the location where the actual sound source is present, in the case where the higher frequency becomes more attenuated as the path difference becomes greater and both of the frequencies are emitted from the same sound source. Then, the calculated area (the intersection point e in the case of Embodiment 2) is specified as the area where the other vehicle is present, and is presented to the user by the presentation unit 104.

Figure 22:
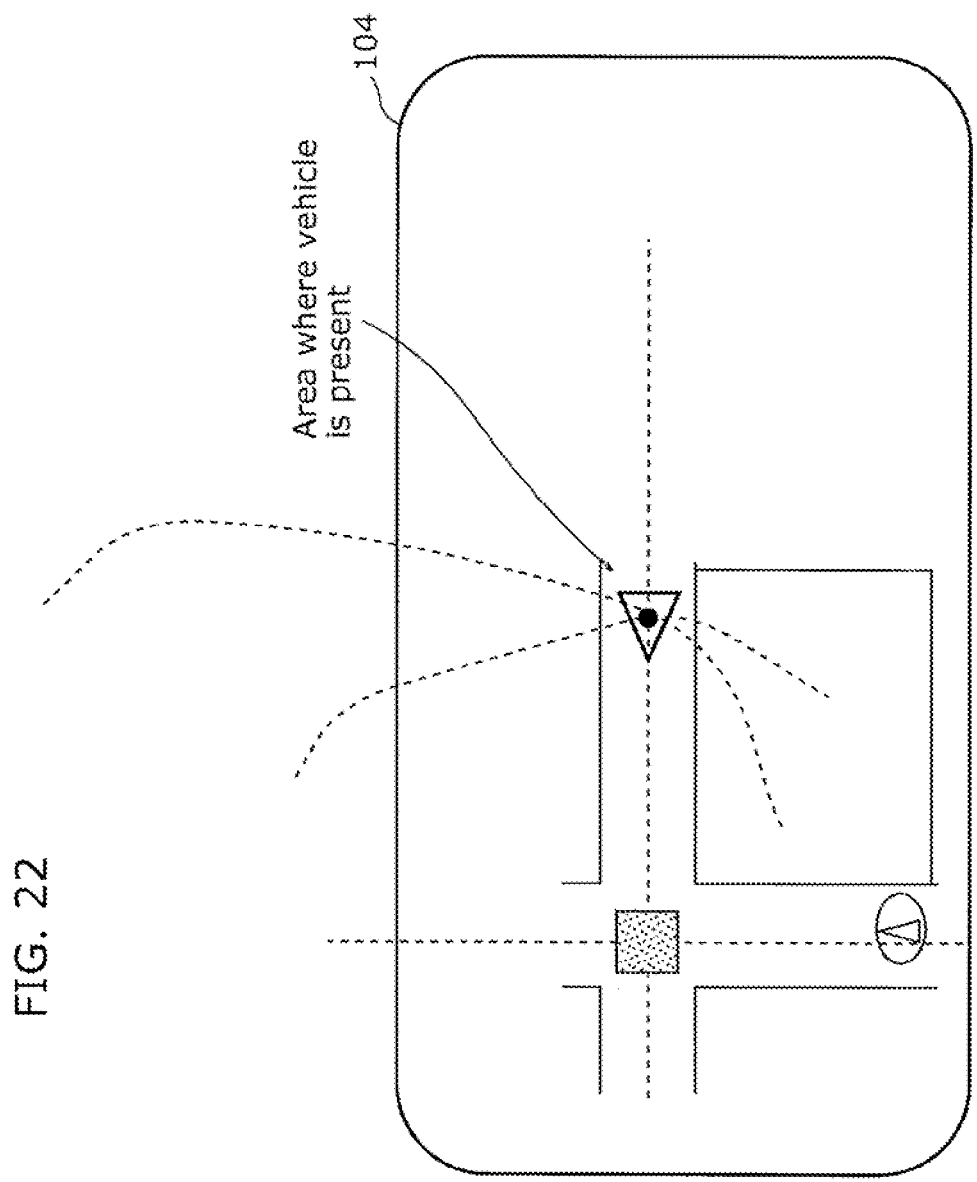
FIG. 22 is a diagram showing a presentation example of the vehicle area according to Embodiment 2.

FIG. 22 is a diagram showing an example where the presentation unit 104 presents, to a user, the specified vehicle area shown in FIG. 21. The display screen of the car navigation apparatus displays the vehicle and the map information about a surrounding area. The sound source location specifying unit 102a has specified that the other vehicle is present within the area shown in FIG. 21, and thus the presentation unit 104 is notifying, through visual and audio warning, the user that the other vehicle is present in the area.

Figure 23:
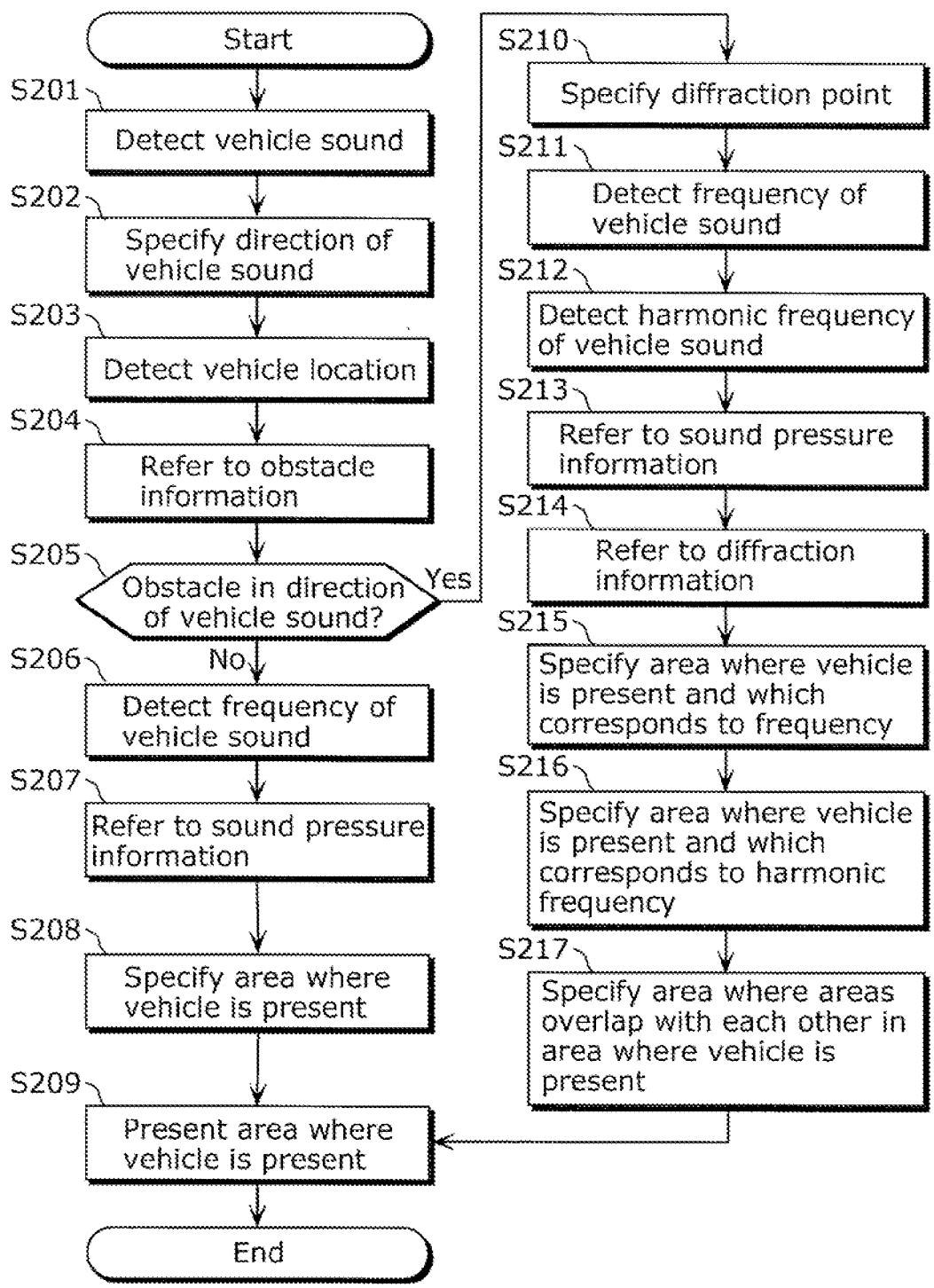
FIG. 23 is a flowchart showing operations of the vehicle location detection device according to Embodiment 2.

An operation flow according to the present invention is described with reference to FIG. 23. The microphones (sound pressure detecting unit 102) detect a vehicle sound of another vehicle (Step S101). Then, the direction specifying unit 106 specifies a direction of the vehicle sound based on a difference in arrival times of the vehicle sound detected by the microphones (sound pressure detecting unit 101) (Step S202). Next, the vehicle location detecting unit 107 detects the vehicle position (Step S203). Then, the diffraction location specifying unit 110h refers to obstacle information stored in the obstacle information storage unit 108, and obtains location information about obstacles (Step S204).

The diffraction location specifying unit 110 determines whether or not an obstacle is present in a direction of the vehicle sound with respect to the vehicle location (Step S205).

When the obstacle is not present (No in Step S205), the vehicle sound frequency detecting unit 105 detects a frequency of the vehicle sound, from the vehicle sound detected by the microphones (sound pressure detecting unit 101) (Step S206). Then, the sound source location specifying unit 102a refers to vehicle sound pressure information stored in the sound pressure information storage unit 103a, and obtains sound pressure information corresponding to the detected frequency (Step S207). Subsequently, the sound source location specifying unit 102a calculates a distance to the other vehicle based on the detected sound pressure and a sound pressure at a location where the other vehicle is present, and specifies an area where the other vehicle is present, based on the distance to the other vehicle and the direction in which the other vehicle is present (Step S208). Finally, the presentation unit 104 presents the specified area where the other vehicle is present (Step S209).

On the other hand, when the obstacle is present (Yes in Step S205), the diffraction location specifying unit 110 specifies a diffraction location based on the vehicle location and the location of the obstacle (Step S210).

The vehicle sound frequency detecting unit 105 detects a frequency of the vehicle sound, from the vehicle sound detected by the microphones (sound pressure detecting unit 101) (Step S211). Furthermore, the vehicle sound frequency detecting unit 105 detects a harmonic frequency of the frequency detected in Step S211, e.g., a frequency twice as high as the detected frequency (Step S212). Then, the sound source location specifying unit 102a refers to vehicle sound pressure information stored in the sound pressure information storage unit 103a, and obtains sound pressure information corresponding to each of the detected frequencies (Step S213). The sound source location specifying unit 102a refers to diffraction information stored in the diffraction information storage unit 109, and obtains the diffraction information (Step S214).

Then, the sound source location specifying unit 102a refers to the sound pressure information obtained in Step S213, and specifies to an area where the other vehicle is present and which corresponds to the frequency (fundamental frequency) of the vehicle sound detected by the vehicle sound frequency detecting unit 105, based on the diffraction location specified in Step S210 and the diffraction information obtained in Step S214 and in view of an attenuation amount of the sound pressure according to a degree of diffraction (Step S215).

Moreover, the sound source location specifying unit 102a refers to the sound pressure information obtained in Step S213, and specifies an area where the other vehicle is present and which corresponds to the harmonic frequency of the vehicle sound detected by the vehicle sound frequency detecting unit 105, based on the diffraction location specified in Step S210 and the diffraction information obtained in Step S214 and in view of the attenuation amount of the sound pressure according to the degree of diffraction (Step S216). Subsequently, the sound source location specifying unit 102a specifies, as the area where the other vehicle is present, an area where candidate areas in each of which the other vehicle is present intersect with each other, based on the area where the other vehicle is present and which is specified in Step S215 and the area where the other vehicle is present and which is specified in Step S216 (Step S217).

Finally, the presentation unit 104 presents the specified area (Step S208).

As described above, the vehicle location detection device 200 according to Embodiment 2 specifies the location at which the detected vehicle in the blind spot is present, by considering, for each of the two frequencies, the fundamental frequency and the harmonic frequency, the attenuation of the sound by distance from the vehicle location to the detected vehicle location and the attenuation of the sound by diffraction.

It is to be noted that, in Embodiment 2, when the diffraction occurs, different frequencies emitted from the same vehicle are detected, and an area where the vehicle is present is specified for each of the different frequencies, and an area where the areas intersect with each other is specified as an area where the vehicle is present. However, it is not necessarily possible to detect the different frequencies such as harmonics. When the vehicle location is predicted using a sound having one frequency, there is a case where an area where the other vehicle is present is extensive. In addition, an attenuation amount of a sound pressure by distance has a range, and there is the case where the area where the other vehicle is present is extensive. Thus, the present invention may not only specify an area where the detected vehicle is present, by using sound pressures of frequencies, but also specify, with further reference to map information, the area where the detected vehicle is present. The following describes a method for detecting a location of a detected vehicle with reference to map information.

FIG. 24 is a diagram showing vehicle sound pressure information. Although the values of the sound pressures are fixed in the vehicle sound pressure information (FIG. 14), sound pressures each of which has a range (here, low sound pressures and high sound pressures) are stored. More specifically, stored are a sound pressure, at a sound source location of a motorcycle sound having the frequency of 100 to 130 Hz, having the range of 38 to 48 dB and a sound pressure, at a sound source location of an automobile sound having the frequency of 30 to 45 Hz, having the range of 35 to 53 dB.

Figure 25:
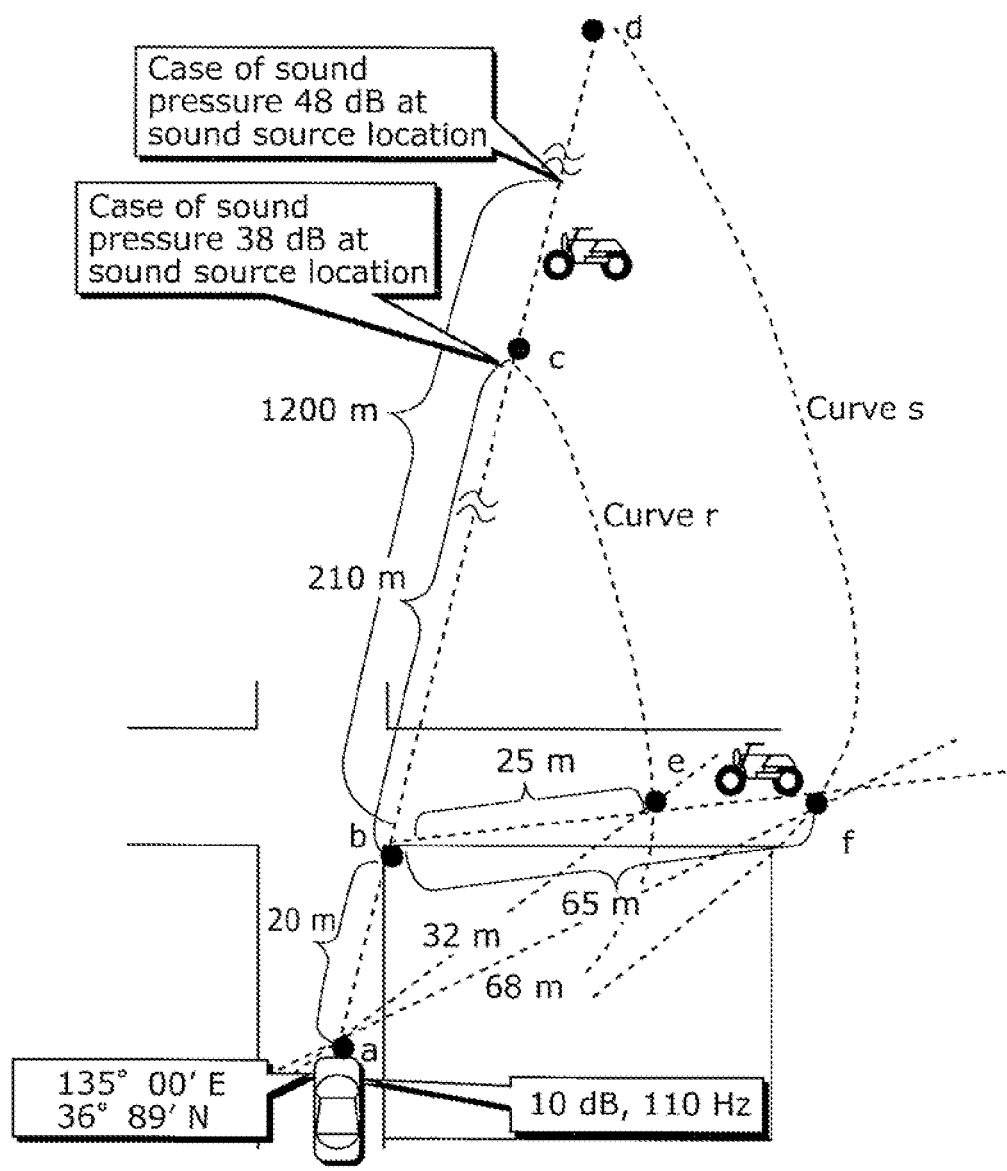
FIG. 25 is a diagram illustrating specification of a vehicle area according to the modification of Embodiment 2.
Figure 26:
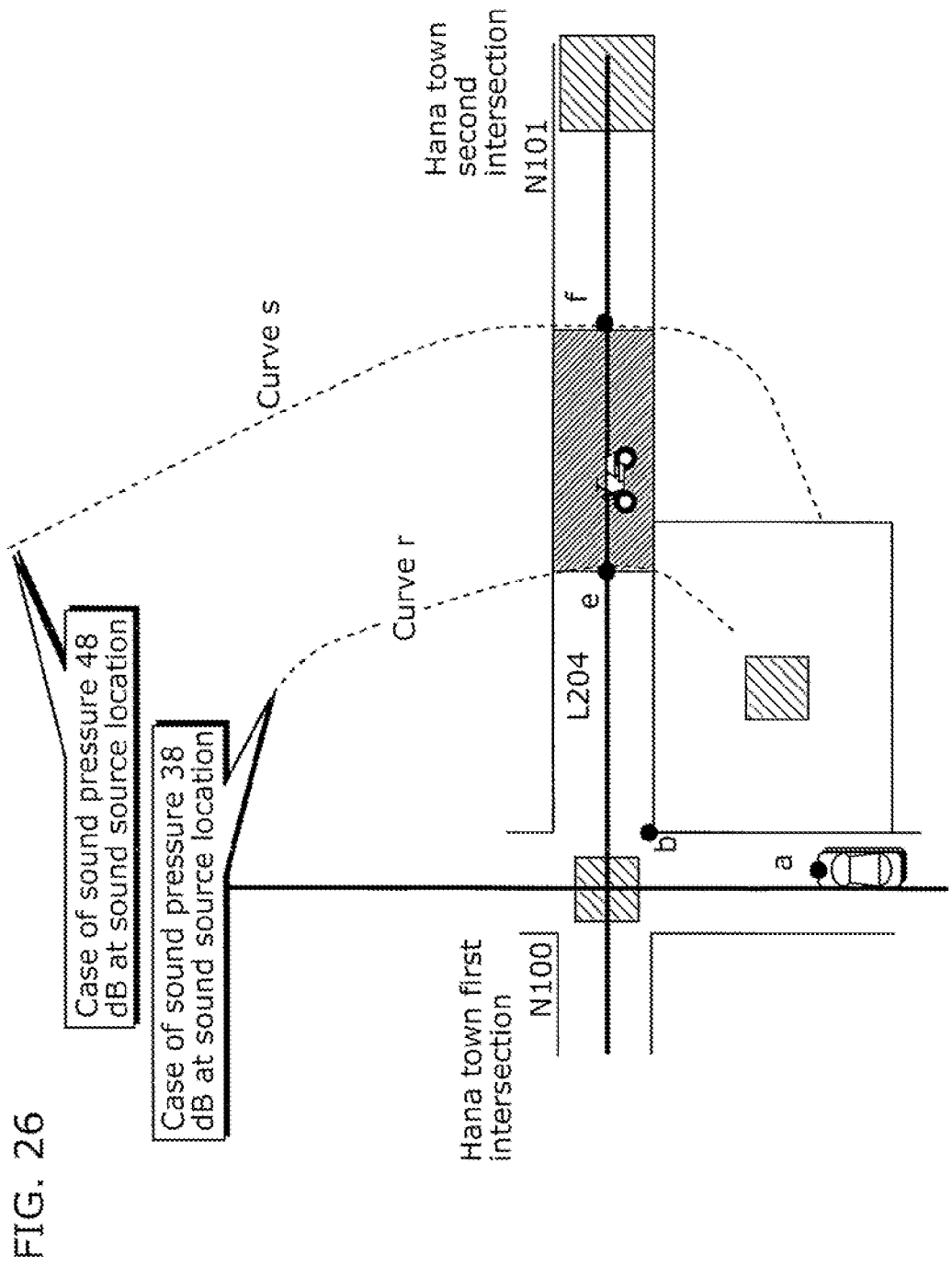
FIG. 26 is a diagram illustrating specification of another vehicle area according to the modification of Embodiment 2.

FIGS. 25 and 26 are diagrams illustrating specification of a vehicle area. As shown in FIG. 25, it is assumed that the vehicle location detecting unit 107 has detected a vehicle location (location a). In addition, it is assumed that the microphones A and B included in a vehicle have detected the frequency of 110 Hz, the sound pressure of 10 dB of the frequency, and a sound source direction on the right at the angle of 10 degrees. In the case of FIG. 25, an obstacle (location b) is present in the direction on the right at the angle of 10 degrees with respect to the vehicle location (location a). Thus, the vehicle location detection device specifies an area where another vehicle is present, in view of attenuation of a sound pressure by diffraction and based on Equation 6.

The sound source location specifying unit 102a refers to vehicle sound pressure information accumulated in the vehicle sound pressure information storage unit 103a, and specifies the area where the other vehicle is present, based on a frequency of a vehicle sound detected by the sound pressure detecting unit 101 (to be more specific, the vehicle sound frequency detecting unit 105) and the sound pressure of the vehicle sound. Here, according to the vehicle sound pressure information, the frequency of 100 to 110 Hz corresponds to a range of 100 to 130 Hz (motorcycle), and the range of the sound pressure is 38 to 48 dB (FIG. 24).

First, assuming that a sound pressure at a sound source location is 38 dB, an attenuation amount of the sound pressure is 28 dB (=38 dB−10 dB). Although the attenuation includes the attenuation by distance and the path difference by diffraction, here, assuming that there is almost no influence of the attenuation by diffraction, that is, assuming that the sound source is on a linear extension from the vehicle location to the obstacle, a distance to the sound source is about 230 m, and it is possible to predict that a location c is the sound source location in FIG. 25. As the path difference increases (i.e., the diffraction becomes greater), the attenuation amount by diffraction increases but the distance to the sound source decreases. For instance, when the sound source location is a location e (a point on a street closest and perpendicular to a traveling direction of the vehicle), a distance between the vehicle (location a) and the obstacle (location b) is 20 m, a distance between the obstacle (location b) and the sound source location (location e) is 25 m, and a linear distance between the sound source and the vehicle location is about 32 m. As stated above, when the distance between the sound source location and the detection location based on Equation 6 and the graph shown in FIG. 20, an elongated area (curve r) including the locations c and e is a location where the sound source at the time when the sound pressure at the sound source location is assumed to be 38 dB is predicted to be present.

Likewise, assuming that the sound pressure at the sound source location is 48 dB, the attenuation amount of the sound pressure is 38 dB (=48 dB−10 dB). Assuming that the sound source is on a linear extension from the vehicle location to the obstacle, the distance to the sound source is about 1200 m, and it is possible to predict that a location d is the sound source location in FIG. 25. On the other hand, for example, when the sound source location is a location f (a point on the street closest and perpendicular to the traveling direction of the vehicle), a distance between the vehicle (location a) and the obstacle (location b) is 20 m, a distance between the obstacle (location b) and the sound source location (location f) is 65 m, and a linear distance between the sound source and the vehicle location is about 68 m. An elongated area including the locations d and f is a location where the sound source at the time when the sound pressure at the sound source location is assumed to be 48 dB is predicted to be present. Accordingly, the sound source location specifying unit 102a calculates an area enclosed by the curves r and s as a range where the sound source (i.e., the detected vehicle) is present.

Then, the sound source location specifying unit 102a specifies, in the calculated area, an area on the street as the area where the other vehicle is present. In Embodiment 2, the street network information accumulated in the obstacle information storage unit 108 such as the map information of the car navigation apparatus is used for specifying whether or not an area is on the street. It is to be noted that, aside from the obstacle information, a storage unit may be separately included as street information.

In FIG. 26, an area where the sound source at the time when the sound pressure at the sound source location is 38 dB is present is enclosed by the curve r. Furthermore, an area where the sound source at the time when the sound pressure at the sound source location is 48 dB is present is enclosed by the curve s. On the other hand, the information about the street networks shown in FIGS. 16 and 17 is accumulated in the obstacle information storage unit 108, and FIG. 26 shows Hana town first intersection (N100), Hana town second intersection (N101), and a link L204 connecting these intersections. The sound source location specifying unit 102a calculates intersection points between, for instance, the areas to enclosed by the curves r and s and the line L204 showing a street. The locations e and f have been calculated as the intersection points. The sound source location specifying unit 102a specifies, as the area where the other vehicle is present, the street (portion marked with diagonal lines) having the locations e and f as end points. As stated above, it is possible to more accurately present, to the user, the area where the other vehicle is present by specifying the area based on the attenuation amount of the sound pressure and further specifying an overlapping area with the street as the area.

Figure 27:
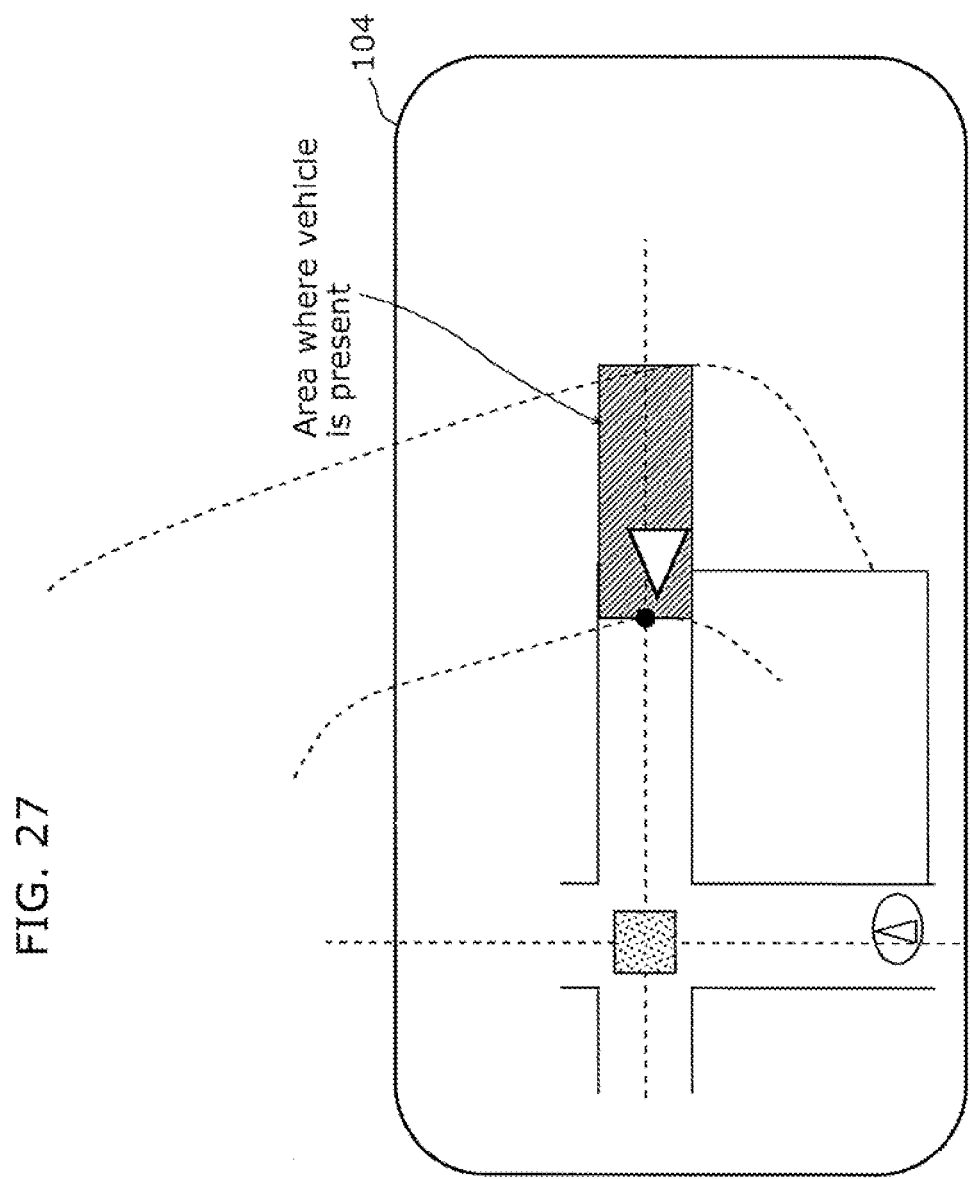
FIG. 27 is a diagram showing a presentation example of the vehicle area according to the modification of Embodiment 2.

FIG. 27 is a diagram showing an example where the presentation unit 104 presents, to a user, the specified vehicle area shown in FIG. 26. The display screen of the car navigation apparatus displays the vehicle and the map information about a surrounding area. The sound source location specifying unit 102a has specified that the other vehicle is present within the area shown in FIG. 27, and thus the presentation unit 104 shows the area marked with diagonal lines and is notifying, through visual and audio warning, the user that the other vehicle is present in the area.

As stated above, the vehicle location detection device according to Embodiment 2 gives the range to the sound pressure at the sound source location, predicts the area where the detected vehicle is present, by considering both the attenuation of the sound pressure by distance and the attenuation of the sound pressure by diffraction, and finally specifies that the area where the predicted area and the street obtained from the map information intersect with each other is the area where the detected vehicle is present. Thus, the location on the street where the vehicle hidden behind the obstacle is predicted to be present is notified to a driver by displaying the range.

It is to be noted that in Embodiment 2, as described with reference to FIG. 11, the area where the detected vehicle is present is present is specified in a more limited way as the detected vehicle is closer to the vehicle, and thus the range presented as the area where the detected vehicle is present becomes narrower as the detected vehicle gets closer to the vehicle. With this, the driver successfully perceives, through a visual sense, the approach of the detected vehicle in a realistic manner.

Although the above has described the vehicle location detection device according to the present invention based on Embodiments 1 and 2 and modifications thereof, the present invention is not limited to the embodiments and the modifications. Without departing from the scope of the present invention, embodiments obtained by making, to the embodiments and the modifications, various modifications conceivable to those skilled in the art and embodiments obtained by arbitrarily selecting and combining the elements of the embodiments and the modifications are included in the present invention.

For example, although the two elongated areas (curves r and s) in each of which the other vehicle is predicted to be present are specified for the two frequencies (the fundamental frequency of the engine sound and the harmonic thereof) in Embodiment 2, it is not always necessary to specify the two elongated areas. Even when one elongated area is specified and the area is displayed, it goes without saying that an area where a vehicle in a blind spot and hidden behind an obstacle is present can be specified, which gives support to safety driving.

Figure 28:
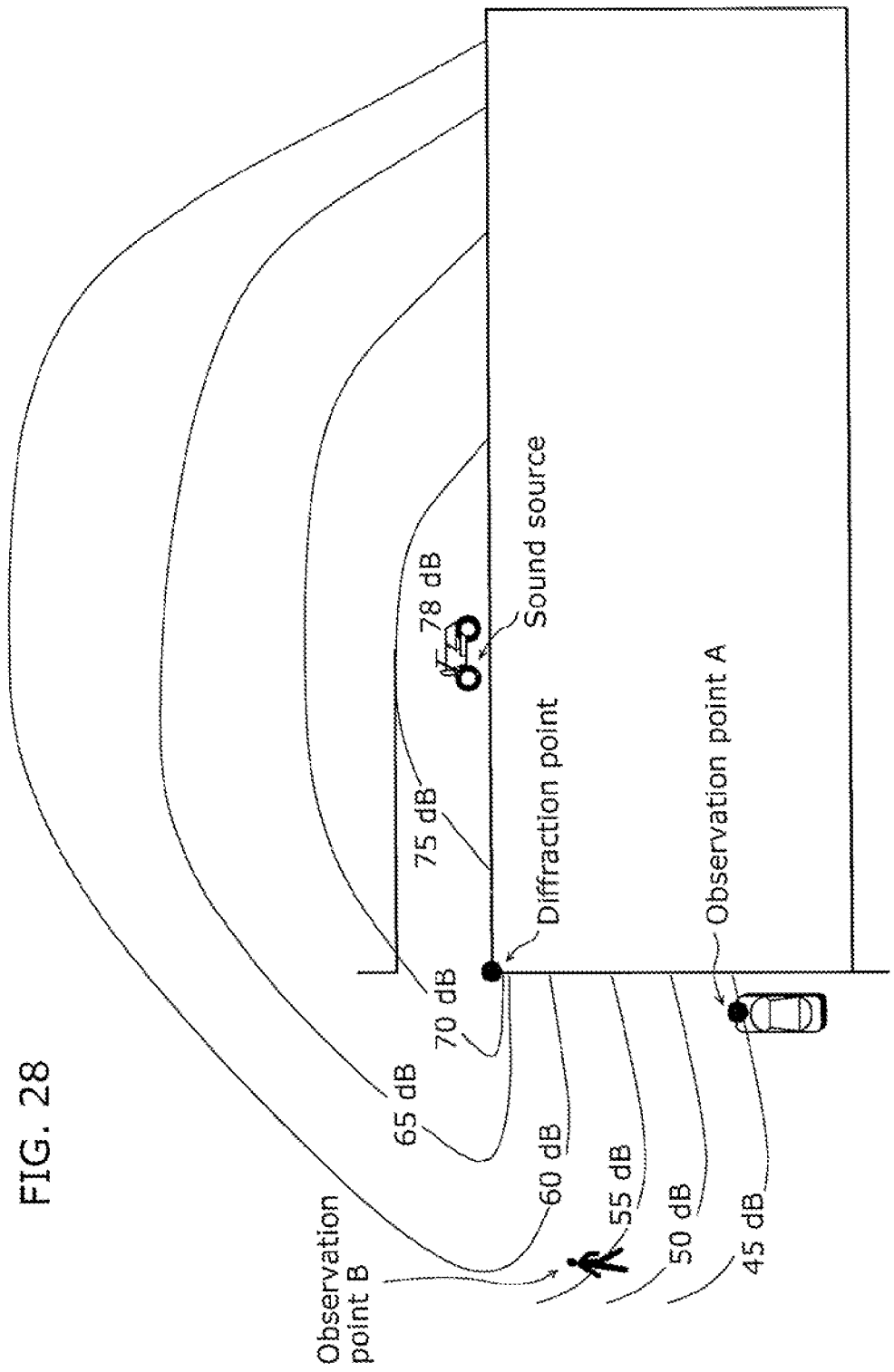
FIG. 28 is a diagram showing another example of diffraction information according to the modification of Embodiment 2.

Moreover, although diffraction information storage unit 109 accumulates, as the diffraction information indicating the relationship between, the positional relationship among the sound source, the diffraction point, and the observation point of the sound and the attenuation amount of the sound pressure, the diffraction information indicating the relationship between the path difference between the path of the diffracted sound and the linear distance and the attenuation amount of the sound pressure, the present invention is not limited to such diffraction information. For example, like an example of diffraction information shown in FIG. 28, the diffraction information may be information (e.g., map format or table format information) indicating a relationship between a positional relationship among a sound source, a diffraction point, and an observation point of a sound and an attenuation amount of a sound pressure. The diffraction information shown in FIG. 28 shows that when a sound pressure at a location of a sound source (here, a motorcycle) is 78 dB, the sound pressure is attenuated depending on a distance from the sound source, such as to 75 dB and 70 dB, that when the sound is diffracted by a building (diffraction point), the attenuation by diffraction becomes effective on top of the attenuation by distance, and, for instance, even though the distance from the sound source is the same, a sound pressure at an observation point B where a degree of diffraction is low is attenuated to 55 dB but a sound pressure at an observation point A where the degree of diffraction is high is attenuated to 45 dB, and so on. Further, since a degree of attenuation by diffraction differs as a frequency differs (the attenuation by diffraction becomes greater as the frequency becomes higher), the diffraction information as shown in FIG. 28 may be accumulated for each frequency. Moreover, although the area where the two elongated areas (areas enclosed by the curves r and s) corresponding to the two sound pressures (low and high sound pressures) registered in the vehicle sound pressure information and the street on the map overlap with each other is predicted as the area where the other vehicle is present in the modification of Embodiment 2, the present invention is not limited to such a use as a use of the street on the map. An area where an elongated area corresponding to one sound pressure (sound pressure having a fundamental frequency) indicated by the vehicle sound pressure information in Embodiment 2 and a street on a map overlap with each other may be predicted as a area where another vehicle is present, or an area where two elongated areas corresponding to two sound pressures (a sound pressure having a fundamental frequency and a sound pressure having a harmonic) and the street on the map overlap with each other may be predicted as the area where the other vehicle is present. Which of the overlapping areas is to be used can be appropriately determined in consideration of accuracy for predicting the area where the other vehicle is present and a processing load (or processing time) having a trade-off relationship with the accuracy.

Furthermore, although Equation 6 has been shown as the rule indicating the attenuation amount dependent on the propagation distance of the sound in Embodiment 2, such a rule is not limited to only an equation and may be a table.

Moreover, among the elements described in the embodiments and the modifications, elements aside from a sensor such as a microphone and an input and output device such as a display device may be implemented by a program executed by a computer or data (i.e., software), by hardware such as an electronic circuit, a memory, and a recording medium, or by a mix of those.

When the present invention is implemented by the software, it goes without saying that the functional elements of the present invention are implemented by executing the program using hardware resources of the computer such as a CPU, a memory, and an input and output circuit. In other words, the CPU reads (takes) data to be processed from the memory or the input and output circuit and computes the data or temporarily stores (outputs) the result of the computation in (to) the memory or the input and output circuit, and thus the functions of each processing unit are implemented.

Furthermore, when the present invention is implemented by the hardware, the present invention may be implemented as a single-chip semiconductor circuit, by mounting semiconductor chips on one circuit board, as one device including all of the elements in one body, or through interaction among devices connected to each other by a transmission line. For instance, the present invention may be implemented by a server and client system by providing the storage unit according to the embodiments to a server apparatus and the processing units according to the embodiments a client apparatus which wirelessly communicates with the server apparatus.

INDUSTRIAL APPLICABILITY

The present invention is applicable, as a vehicle location detection device which detects a location of another vehicle around a vehicle, especially as a vehicle location detection device which specifies a location of another vehicle hidden behind an obstacle, to a car navigation apparatus which separately presents, to a driver, an approaching vehicle in a blind spot and another vehicle in a blind spot and still at a far distance, when, for example, it is intended to prevent a collision at an intersection having poor visibility.

What is claimed is:

1. A vehicle location detection device which is mounted in a vehicle and detects a location of another vehicle near the vehicle, said vehicle location detection device comprising:
    an obstacle information storage unit configured to store obstacle information indicating a geographical location of an obstacle which is likely to block propagation of a vehicle sound;
    a sound pressure information storage unit configured to store vehicle sound pressure information indicating a sound pressure of a vehicle sound at a sound source location;
    a diffraction information storage unit configured to store diffraction information indicating a relationship between a positional relationship and an attenuation amount of a sound pressure, the positional relationship being a relationship among a sound source, a diffraction point, and an observation point of a sound when the sound is diffracted and propagated;
    a sound pressure detecting unit configured to detect a sound pressure of a vehicle sound which has reached the vehicle;
    a direction specifying unit configured to specify a direction from which the vehicle sound has reached;
    a vehicle location detecting unit configured to detect a vehicle location which is a location of the vehicle;
    a diffraction location specifying unit configured to refer to the obstacle information stored in said obstacle information storage unit, and specify a location of an obstacle in the direction specified by said direction specifying unit, based on the vehicle location detected by said vehicle location detecting unit;
    a sound source location specifying unit configured to calculate an attenuation amount of the sound pressure of the vehicle sound by subtracting the sound pressure detected by said sound pressure detecting unit from the sound pressure indicated by the vehicle sound pressure information stored in said sound pressure information storage unit, and specify a location where the other vehicle emitting the vehicle sound is predicted to be present, by specifying a sound source location of a sound diffracted by the obstacle which is specified by said diffraction location specifying unit and serves as a diffraction point, based on the calculated attenuation amount, a rule indicating an attenuation amount dependent on a propagation distance of the sound, and the relationship indicated by the diffraction information stored in said diffraction information storage unit; and
    a presentation unit configured to present the location specified by said sound source location specifying unit.

2. The vehicle location detection device according to claim 1,
    wherein the diffraction information indicates, as the relationship between the positional relationship and the attenuation amount of the sound pressure, a relationship between a path difference which the sound is attenuated depending on and an attenuation amount of a sound pressure, the path difference being a difference between a distance of a path from the sound source of the diffracted sound through the diffraction point to the observation point of the sound and a linear distance from the sound source to the observation point, and
    said sound source location specifying unit is configured to specify the sound source location based on the rule indicating the attenuation amount dependent on the propagation distance of the sound and the relationship between the path difference and the attenuation amount of the sound pressure, the relationship being indicated by the diffraction information stored in said diffraction information storage unit.

3. The vehicle location detection device according to claim 2,
    wherein said sound source location specifying unit is configured to specify: a plurality of paths as paths which satisfy the rule and the relationship and on which the sound is diffracted; an elongated area by connecting sound source locations on the specified paths; and, within the specified elongated area, the location where the other vehicle emitting the vehicle sound is predicted to be present.

4. The vehicle location detection device according to claim 3,
    wherein said sound pressure information storage unit is configured to store, for frequencies, pieces of vehicle sound pressure information in each of which a frequency of the vehicle sound and the sound pressure are associated with each other,
    said sound pressure detecting unit further includes a vehicle sound frequency detecting unit configured to detect the frequency and the sound pressure of a main frequency component that is included in the vehicle sound, by performing frequency resolution on the vehicle sound, and
    said sound source location specifying unit is configured to calculate, for the frequency detected by said vehicle sound frequency detecting unit, the attenuation amount of the sound pressure of the vehicle sound by subtracting a sound pressure corresponding to the frequency detected by said vehicle sound frequency detecting unit from the sound pressure indicated by the vehicle sound pressure information stored in said sound pressure information storage unit.

5. The vehicle location detection device according to claim 4,
    wherein said sound pressure information storage unit is configured to store, for fundamental frequencies of different engine sounds, the pieces of the vehicle sound pressure information, and
    said vehicle sound frequency detecting unit is configured to detect a frequency and a sound pressure of a fundamental frequency component of an engine sound included in the vehicle sound.

6. The vehicle location detection device according to claim 5,
    wherein said sound pressure information storage unit is further configured to store, for harmonics of the fundamental frequencies of the different engine sounds, the pieces of the vehicle sound pressure information,
    said vehicle sound frequency detecting unit is configured to detect the fundamental frequency component and a harmonic component each of which includes the frequency and the sound pressure of the engine sound included in the vehicle sound, and
    said sound source location specifying unit is configured to specify, for each of the fundamental frequency component and the harmonic component detected by said vehicle sound frequency detecting unit, the elongated area, and specify, as the location where the other vehicle emitting the vehicle sound is predicted to be present, an area where the specified elongated area corresponding to the fundamental frequency component and the specified elongated area corresponding to the harmonic component overlap with each other.

7. The vehicle location detection device according to claim 5,
wherein said sound pressure information storage unit is configured to store, for each of the fundamental frequencies of the different engine sounds, pieces of vehicle sound pressure information each of which indicates the sound pressure at the sound source location with a range of the sound pressure using at least a low sound pressure and a high sound pressure, and
said sound source location specifying unit is configured to (i) calculate, for each of the low sound pressure and the high sound pressure which correspond to the frequency detected by said vehicle sound frequency detecting unit and are indicated by the pieces of the vehicle sound pressure information, the attenuation amount of the sound pressure of the vehicle sound by subtracting the sound pressure corresponding to the frequency detected by said vehicle sound frequency detecting unit from the sound pressure indicated by the vehicle sound pressure information stored in said sound pressure information storage unit, (ii) specify, for each of the low sound pressure and the high sound pressure, the elongated area based on the calculated attenuation amount, and (iii) specify, as the location where the other vehicle emitting the vehicle sound is predicted to be present, an area which is enclosed by the specified elongated area corresponding to the low sound pressure and the specified elongated area corresponding to the high sound pressure.

8. The vehicle location detection device according to claim 1,
wherein said obstacle information storage unit is further configured to store map information indicating a location of a street, and
said sound source location specifying unit is configured to specify, as the location where the other vehicle emitting the vehicle sound is predicted to be present, an area which is within an elongated area and on the street indicated by the map information.

9. The vehicle location detection device according to claim 6,
wherein said obstacle information storage unit is further configured to store map information indicating a location of a street, and
said sound source location specifying unit is configured to specify, as the location where the other vehicle emitting the vehicle sound is predicted to be present, an area where the elongated areas overlap with each other and which is on the street indicated by the map information.

10. The vehicle location detection device according to claim 7,
wherein said obstacle information storage unit is further configured to store map information indicating a location of a street, and
said sound source location specifying unit is configured to specify, as the location where the other vehicle emitting the vehicle sound is predicted to be present, an area which is enclosed by the elongated areas and is on the street indicated by the map information.

11. A non-transitory computer-readable recording medium on which a program is recorded, the program causing, when loaded onto a computer included in the vehicle location detection device according to claim 1, to execute a vehicle location detection method performed by the vehicle location detection device which is mounted in the vehicle and detects a location of another vehicle near the vehicle,
said vehicle location detection method comprising:
detecting a sound pressure of a vehicle sound which has reached the vehicle;
specifying a direction from which the vehicle sound has reached;
detecting a vehicle location which is a location of the vehicle;
referring to the obstacle information stored in the obstacle information storage unit, and specifying a location of an obstacle in the direction specified in said specifying of a direction, based on the vehicle location specified in said detecting of a vehicle location;
calculating an attenuation amount of the sound pressure of the vehicle sound by subtracting the sound pressure detected in said detecting of a sound pressure from the sound pressure indicated by the vehicle sound pressure information stored in the sound pressure information storage unit, and specifying a location where the other vehicle emitting the vehicle sound is predicted to be present, by specifying a sound source location of a sound diffracted by the obstacle which is specified in said referring and serves as a diffraction point, based on the calculated attenuation amount, a rule indicating an attenuation amount dependent on a propagation distance of the sound, and the diffraction information stored in the diffraction information storage unit; and
presenting the location specified in said calculating and specifying.

12. A vehicle location detection method performed by a vehicle location detection device which is mounted in a vehicle and detects a location of another vehicle near the vehicle,
wherein the vehicle location detection device includes:
an obstacle information storage unit configured to store obstacle information indicating a geographical location of an obstacle which is likely to block propagation of a vehicle sound;
a sound pressure information storage unit configured to store vehicle sound pressure information indicating a sound pressure of a vehicle sound at a sound source location; and
a diffraction information storage unit configured to store diffraction information indicating a relationship between a positional relationship and an attenuation amount of a sound pressure, the positional relationship being a relationship among a sound source, a diffraction point, and an observation point of a sound when the sound is diffracted and propagated,
said vehicle location detection method comprising:
detecting a sound pressure of a vehicle sound which has reached the vehicle;
specifying a direction from which the vehicle sound has reached;
detecting a vehicle location which is a location of the vehicle;
referring to the obstacle information stored in the obstacle information storage unit, and specifying a location of an obstacle in the direction specified in said specifying of a direction, based on the vehicle location specified in said detecting of a vehicle location;
calculating an attenuation amount of the sound pressure of the vehicle sound by subtracting the sound pressure detected in said detecting of a sound pressure from the sound pressure indicated by the vehicle sound pressure information stored in the sound pressure information storage unit, and specifying a location where the other vehicle emitting the vehicle sound is predicted to be present, by specifying a sound source location of a sound diffracted by the obstacle which is specified in said referring and serves as a diffraction point, based on the calculated attenuation amount, a rule indicating an attenuation amount dependent on a propagation distance of the sound, and the diffraction information stored in the diffraction information storage unit; and presenting the location specified in said calculating and specifying.

* * * * *